(12) United States Patent
Kira

(10) Patent No.: US 6,317,656 B1
(45) Date of Patent: Nov. 13, 2001

(54) RATE MONITOR FOR A DISPLACEMENT SYSTEM UTILIZING THE POWER DEMAND OF THE PRIME MOVER OF THE SYSTEM TO PROVIDE THE FLOW RATE DATA OF THE MATERIAL BEING DISPLACED

(75) Inventor: Alan K. Kira, Honolulu, HI (US)

(73) Assignee: Tecnetics Industries, Inc., St. Paul, MN (US)

( * ) Notice: Subject to any disclaimer, the term of this patent is extended or adjusted under 35 U.S.C. 154(b) by 0 days.

(21) Appl. No.: 09/041,693

(22) Filed: Mar. 13, 1998

Related U.S. Application Data

(63) Continuation-in-part of application No. 08/693,360, filed on Aug. 6, 1996, now abandoned.
(60) Provisional application No. 60/016,612, filed on May 1, 1996, and provisional application No. 60/013,175, filed on Mar. 12, 1996.

(51) Int. Cl.$^7$ .............................. G05D 7/00; G01G 11/14
(52) U.S. Cl. ................................ 700/282; 702/45; 177/16
(58) Field of Search .................................... 700/282, 281, 700/305; 702/45, 46; 198/810.01; 177/15, 16, 50, 60, 119, 121, 145, 199, 210 R; 222/52, 55, 57, 63, 71, 77, 251, 333; 73/861, 863, 861.77, 198, 863.91; 417/53, 411

(56) References Cited

U.S. PATENT DOCUMENTS

| | | |
|---|---|---|
| 2,681,763 | 6/1954 | Saxe ...................................... 235/61 |
| 3,722,660 | 3/1973 | Snead .................................... 198/39 |
| 3,899,915 | 8/1975 | Williams, Jr. et al. ................ 73/1 R |
| 3,942,625 | 3/1976 | Snead .............................. 198/810.01 |
| 3,960,225 | 6/1976 | Hyer et al. ........................... 177/121 |
| 3,979,055 | 9/1976 | Fathauer et al. ................ 235/92 WT |
| 3,985,266 | 10/1976 | Wright, Jr. ............................. 222/22 |
| 4,141,244 | 2/1979 | Dumbeck ........................... 73/133 R |
| 4,199,871 | 4/1980 | Ward et al. .............................. 34/25 |
| 4,863,009 | 9/1989 | Winkel et al. ....................... 198/505 |
| 4,954,975 | 9/1990 | Kalata ................................. 364/567 |
| 5,318,409 | * 6/1994 | London et al. ........................ 417/53 |
| 5,380,957 | 1/1995 | Giles ..................................... 177/16 |
| 5,393,939 | 2/1995 | Nasuta, Jr. et al. ................. 177/145 |

* cited by examiner

Primary Examiner—William Grant
Assistant Examiner—Steven R. Garland
(74) Attorney, Agent, or Firm—Shlesinger, Arkwright & Garvey LLP

(57) ABSTRACT

A flow rate monitor for indicating the amount of material being displaced in a displacement system having an electric motor as a prime mover, comprises a power demand monitor for being operably connected to the electric motor; a programmable controller operably connected to the power demand monitor, the controller being adapted to convert the data from the power demand monitor to flow rate data using at least one linear equation relating the power demand of the electric motor to the flow rate of the material, the programmable controller being adapted to parallel shift the at least one linear equation to compensate for any changes to the no-load power demand; and an indicator for indicating the flow rate of the material.

12 Claims, 26 Drawing Sheets

RATE MONITOR FOR A DISPLACEMENT SYSTEM UTILIZING THE POWER DEMAND OF THE PRIME MOVER OF THE SYSTEM TO PROVIDE THE FLOW RATE DATA OF THE MATERIAL BEING DISPLACED

This is a continuation-in-part of U.S. application Ser. No. 08/693,360, filed Aug. 6, 1996, now abandoned, which claims the benefit of U.S. Provisional Application Serial No. 60/013,175, filed Mar. 12, 1996 and U.S. Provisional Application Serial No. 60/016,612, filed May 1, 1996, which are herein incorporated by reference.

RELATED APPLICATIONS

FIELD OF THE INVENTION

The present invention generally relates to an apparatus and a method of generating flow rates for displaceable materials in a displacement system using conveyor belt, augers, bucket elevators, horizontal screws dedicated pneumatic conveyors, and the like, by utilizing the power demand of the prime mover of the system to provide the flow rate data of the material being displaced.

BACKGROUND OF THE INVENTION

Prior art methods of measuring displaceable material, such conveyed crushed rock, coal, feed, etc, augered material such as powder, seeds, cement, etc, and liquid material such as water, oil, etc, are limited to conveyor belt and gravimetric scales which are calibrated to read in unit weight per unit time, or liquid flow rate meters reading in units of liquid measure per unit time, etc. The prior art methods strive for accuracy through sophisticated electronic components in precision electro-mechanical interaction, such as conveyor scales with electronic load cells, sensing physical movement in relation to the amount of material on the conveyor scale, or rotary impellers coupled to a sensor for liquids, or electronic physical displacement sensors mechanically coupled to an impacting surface measuring the rate of material flowing through a pipe, etc, resulting in the desired unit of measurement.

Prior art conveyor belt scales typically consists of a scale carriage with load cells and/or linear differential transformers and associated electronic circuits, a conveyor motion or speed sensor, and several idlers before and after the scale carriage. Installation of a conveyor belt scale generally requires mechanics and welders to mount the scale to the conveyor frame, electrician to run conduit and wires from the main panel in the control room to the scale, and trained factory technicians to inspect and configure the scale to the specific application. Thus, the installation process can be quite involved, including significant installation work, lengthy field wire runs conveyor, frame modification, weigh bridge installation, mechanical line-up for accuracy, additional sensor mounting and associated wires for conveyor speed, etc.

Conventional belt scales require almost constant calibration and trimming to account for variations in material density, conveyor belt carriage alignment, conveyor belt centering, wedged rocks in-between the scale measuring beams, etc., to obtain material flow rate data within the error tolerance of the scales. Maintenance personnel would need basic understanding of the conveyor belt system, scale carriage, load cell, speed sensor, electronics associated, etc., in addition to being familiar with voluminous user manuals. Thus, prior art systems are sophisticated electro-mechanical systems requiring highly trained personnel for installation and maintenance.

There is therefore a need for flow rate monitor that replaces complicated belt scales and requires no expertise on conveyor scales and their associated load cells, linear voltage differential transformers, scale beams, etc. and minimizes a large portion of the installation headaches that generally accompany the industrial belt scales.

There is therefore a need for flow rate monitor that compensated for the zero drift caused by mechanical components warm-up, changes in the ambient temperature and seasonal changes.

OBJECTS AND SUMMARY OF THE INVENTION

It is an object of the present invention to provide a rate monitor for displaceable materials that involves no electronic load cells, linear voltage differential transformers (LDT), etc, mechanical impellers, switches, nor any kind of electro-mechanical interaction.

It is still another object of the present invention to provide a rate monitor for conveyed materials that eliminates the use of scale carriages fitted into the conveying system.

It is still another object of the present invention to provide a rate monitor for conveyed materials that eliminates the need for conveyor frame modification or the need to cut into a pressurized pipe to bolt a flow sensor or gravimetric scale.

It is yet another object of the present invention to provide a rate monitor for conveyed materials that eliminates running lengthy field wiring for system power or for signal cables back to the main control room.

It is another object of the present invention to provide a rate monitor that minimizes the concern with a conveyor angle of inclination which would interfere with scale accuracy or the minimum number of idlers before and after the typical conveyor scale installation.

It is still another object of the present invention to provide a rate monitor for conveyed materials that eliminates mechanical motion sensors.

It is yet another object of the present invention to provide a rate monitor for conveyed materials that provides system overburden/overload alarm.

It is still another object of the present invention to provide a rate monitor for conveyed materials that compensates for zero drift during operation with or without user intervention to maintain flow rate accuracy.

It is another object of the present invention to provide a rate monitor that is relatively easy to install, thereby minimizing the installation-intensive problems associated with prior art belt scales.

In summary, the present invention provides a flow rate monitor for indicating the amount of material being conveyed in a conveying system having a prime mover, comprising a power demand monitor for being operably connected to the prime mover; a programmable controller operably connected to the power demand monitor, the controller being adapted to convert the data from the power demand monitor and convert it to flow rate data using a linear relationship between the power demand of the prime mover and the flow rate of the material; and an indicator for indicating the flow rate of the material.

The present invention also provides a method for measuring the amount of material being displaced in any displacement system with an electric motor as a prime mover, in a substantially linear region of operation where the power demand of the prime mover is linearly related to the flow rate of the material, comprising the steps of establishing a linear equation relating the flow rate to the power demand by measuring the power demand of the prime mover when the displacement system is running empty to obtain the system-no-load power demand, and measuring the power demand of the prime mover when the displacement system is loaded with a known amount of material to obtain an actual flow rate corresponding to the power demand under load; monitoring the power demand of the prime mover; and calculating and displaying the flow rate of the material being conveyed from the monitored power demand and the linear equation.

In a system where the power demand is not linearly related to the flow rate of the material, the power demand is approximated by a series of linear zones whereby the flow rate is linearly related to the power demand in each zone.

These and other objects of the present invention will become apparent from the following detailed description.

BRIEF DESCRIPTIONS OF THE DRAWINGS

DETAILED DESCRIPTION OF THE INVENTION

It is common knowledge that power used by an electric motor to perform work is a product of the voltage, current, cosine of the phase angle between the voltage and current, known as power factor, and efficiency of the motor. Efficiency is defined as the output power divided by the input power. Where the line voltage of the system is relative constant and the current varying linearly in relation to the load impressed on the motor, power will be fairly linear and will used in the present invention as an indicator of the physical load on the system. The efficiency of the electric motor is fairly constant at 15% of full load or greater. Thus, monitoring output or input horsepower is immaterial when the motor is loaded to greater than 15% of full load. Power consumed by an electric motor that is operably connected to a mechanical system displacing the material is then directly proportional to the load on the motor and is a reliable indicator of how much material the conveying system is transporting at any given time.

The present invention will employ this relationship between power consumed by an electric motor and the amount of material being displaced. The load on an electrical motor relates to the amount of work that it has to perform or deliver, varying from a minimum no-load condition to a maximum full-load condition. The power of the electric motor is translated into output horsepower by the following formula, $$\text{Horsepower}_{output} = \text{Watts}_{motor\ input} * \text{Efficiency}/746.$$

Therefore, the more horsepower required to transport material, the more power is required from the electrical system; or the more material being transported, the more power required to do the work. Hence, when operably connected to a mechanical system, power consumed and the resulting horsepower delivered by an electric motor will be directly related to the amount of material in the system from no-load to full-load, which can be represented in accordance with the present invention, by a straight line graph.

The present invention will now be described using the example of a conveyor belt system. However, it should be understood that the present invention would be equally applicable to bucket elevators, horizontal screws, single system/dedicated pneumatic conveyors, very short length conveyors, or any system utilizing an electric motor or prime mover whose power output parameters can be monitored to provide a measure of the amount of materials being conveyed per unit of time.

Figure 1:
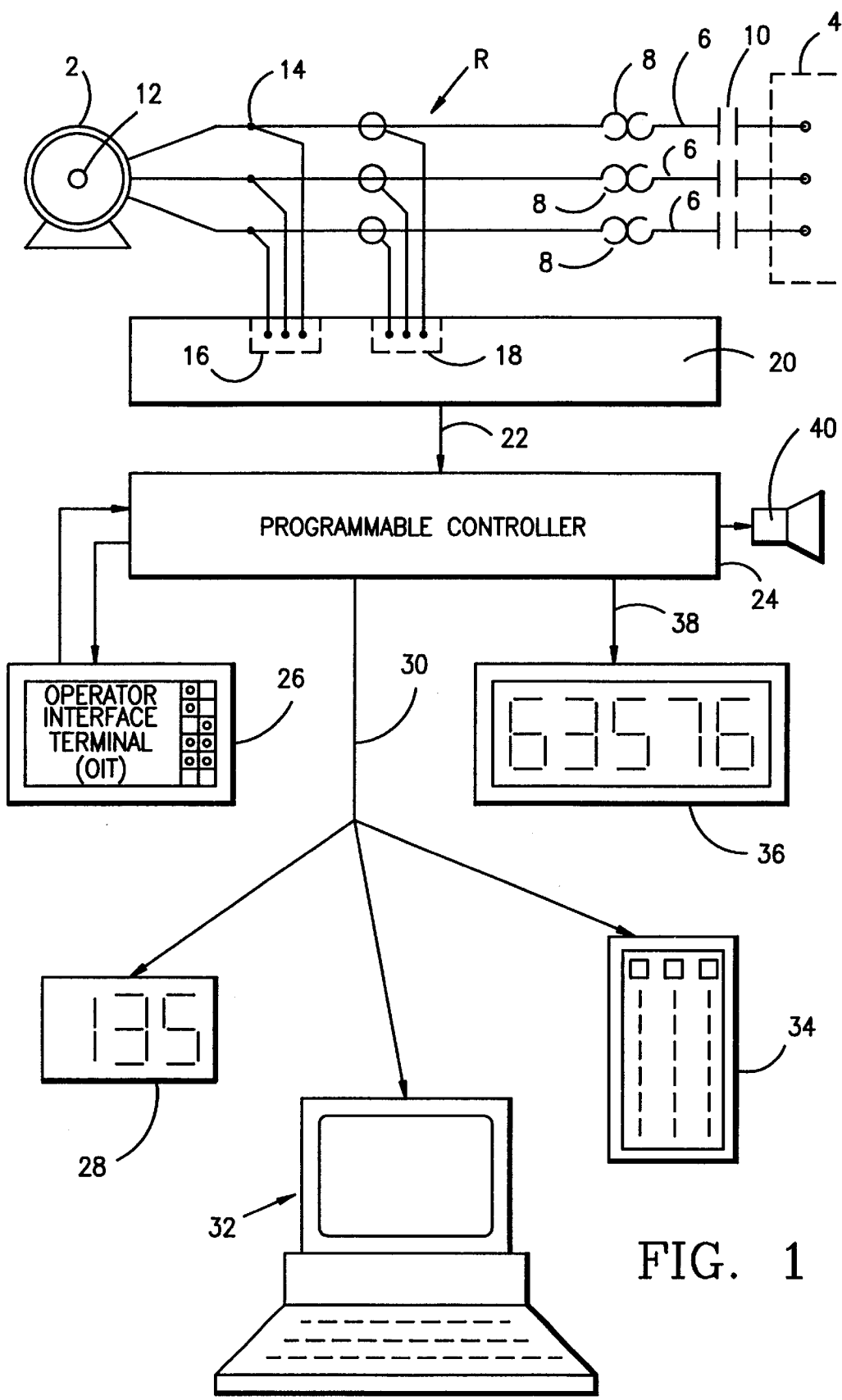
FIG. 1 is a block diagram of a flow rate monitor made in accordance with the present invention.

A rate monitor R made in accordance with the present invention is disclosed in FIG. 1. An electric motor 2 is operably connected to a conveyor belt (not shown) that is used to convey displaceable materials, such crushed rock, coal, feed, etc. An electric panel 4 provides a three-phase power to the motor 2 through wires 6 with overload elements 8. A motor starter 10 is provided for starting or stopping the motor 2. The motor 2 has an output shaft 12 that is mechanically coupled to the conveyor belt.

The wires 6 are tapped at 14 and fed a voltage sensor 16. Current sensors 18 are provided to measure the current flowing through the lines 6. The voltage and current data from the sensors 16 and 18 are combined in a standard power measuring device 20 whose output signal 22 corresponds to the power demand of motor 2.

The output 22 is fed to a programmable device 24 that converts the power data from the device 20 into a flow rate date for the materials being conveyed. An example of the power sensing unit is available from Load Controls, Inc., 10 Picker Road, Sturbridge, Mass. 01566, Model PH-3A Powercell.

The programmable device 24 can be an electronic circuit, programmable logic controller, embedded memory card or any electronic device that is programmed in accordance with the present invention to process the power data into flow rate data. An example of the programmable device 24 is a programmable logic controller available from PLO Direct, Model D2-04B, 305 Hutchinson Road, Cumming, Ga. 30130.

An operator interface terminal (OIT) 26 is operably connected to the device 24 and provides a means for the user to input the necessary parameters to the device 24 and to display data and messages during operation of the monitor R. The operator interface terminal 26 is a standard device, such as Model PV1000, available from PLC Direct.

At least one output device is connected to the programmable device 24 to obtain a readout of the material flow rate. A flow rate display 28 converts the flow rate output signal 30 to weight per unit time, such as ton/hour, pounds/minute, etc. A process control computer system 32 can also be connected to the device 24 to monitor and store the flow rate output 30. A process loop controller 34 can also be connected to the device 24 so that depending on the value of the flow rate output signal 30, certain valves, pumps, etc. can be operated or otherwise controlled by the controller 34.

A totalizer accumulator counter 36 can also be connected to the device 24 through an integrator output signal 38 which can be in the form of a pulse train, wherein each pulse corresponds to a unit weight or fraction thereof. An alarm 40 is connected to the device 24 to indicate when a high or low power demand limit has been reached. A high setting alarm would indicate system overload while a low setting alarm would indicate some mechanical problems, such as mechanical disengagement of the motor with the conveyor belt.

The programmable device 24 will now be described in detail.

The monitor R approximates the relationship of the electrical motor power output or power demand of the motor 2 to the flow rate of material being displaced by the conveyor with a series of connected straight line segments, dividing the power curve into multiple zones, each zone being represented by a linear equation. The present invention will be described using up to three zones but it should be understood that a greater number of zones can also be used.

Figure 2:
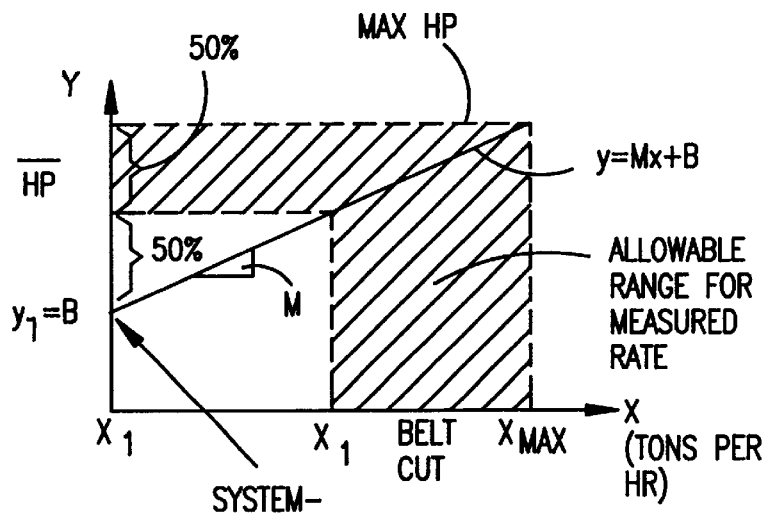
FIG. 2 is a graph of the rate flow against the power demand of the prime mover for a linear system.

Referring to FIG. 2, a single zone model is disclosed, using the single straight line equation, $$Y = MX + B,$$

where B is the Y intersect at $X_1=0$,

M is the rate of change or slope of the line, or $M=(Y_2-Y_1)/(X_2-X_1)$.

In Cartesian coordinates, the Y axis represents the horsepower output or power demand of the electric motor 2 and the X axis represents the flow rate of the material being conveyed or displaced by the conveyor belt.

The value of the slope M is derived from the proportional relationship between an actual measured change of displaceable material in the system and the respective change in power output by the electric motor 2 to move, convey, transport, displace, or process the increase or decrease in the displaceable material. The value of X represents the material flow rate in units of weight or volume per unit time, such as tons/hour, gallons/hour, pounds/minute. etc.

The Y intersect or B is the minimum no-load power output of the motor or prime mover operating or moving the mechanical displacement or conveying system without any material actually going through it. The Y intersect also sets the area beyond which the motor efficiency remains fairly constant. The value of B is generally greater than 15% of the motor full load capacity. The efficiency curve of the motor is substantially linear beyond the 15% point.

Accordingly, the horsepower output of the electric motor and the flow rate of the material being conveyed in a single zone system may be represented by the following equation, $Y = M*X + B$, or $X = (Y-B)/M$.

Figure 3:
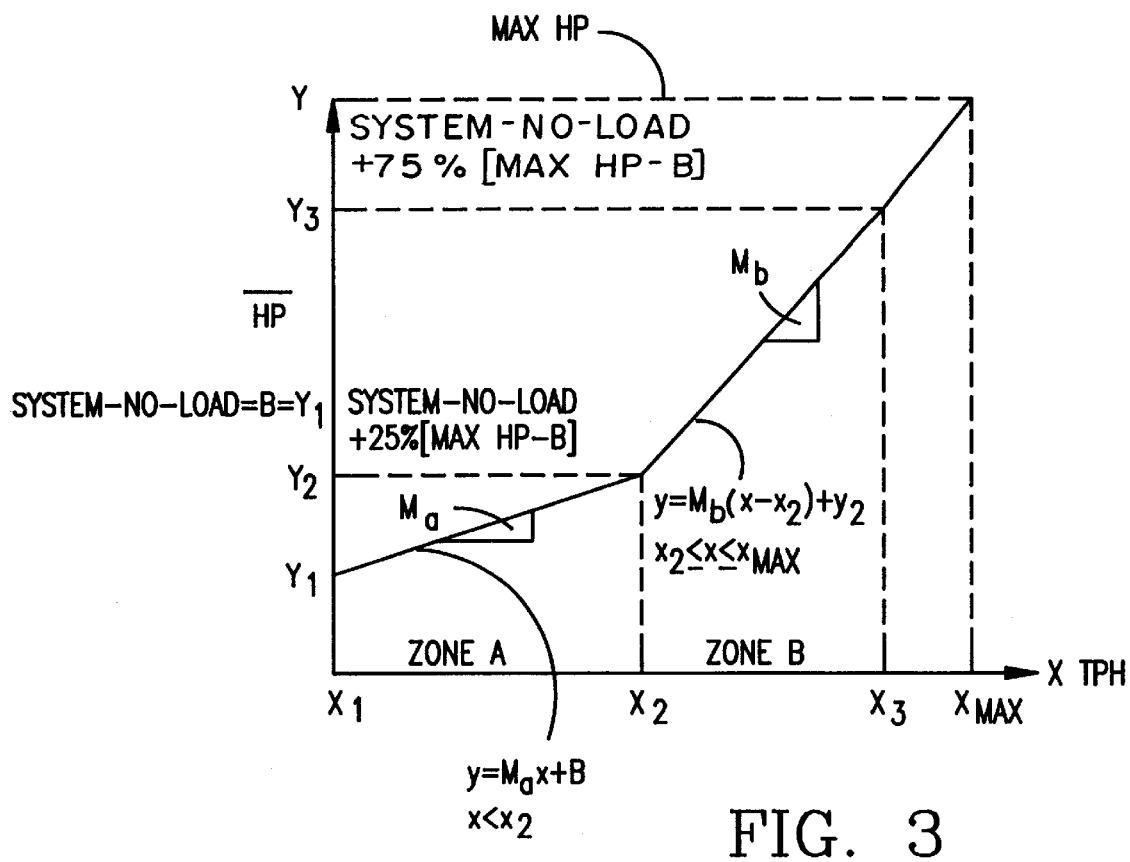
FIG. 3 is a graph of the rate flow against the power demand of the prime mover for a semi-linear system.

Referring to FIG. 3, a two-zone model is disclosed, approximated by two straight line segments represented compositely by the equations, $Y = M_a X + B$, or $X = (Y-B)/M_a$, where $M_a = (Y_2-Y_1)/(X_2-X_1)$, $Y_1 \leq Y \leq Y_2$, $Y_1 = B$, and $Y = M_b(X-X_2) + Y_2$, or $X = (Y-Y_2)/M_b + X_2$, where $M_b = (Y_3-Y_2)/(X_3-X_2)$ and $Y_2 \leq Y \leq Y_{MAX}$.

Figure 4:
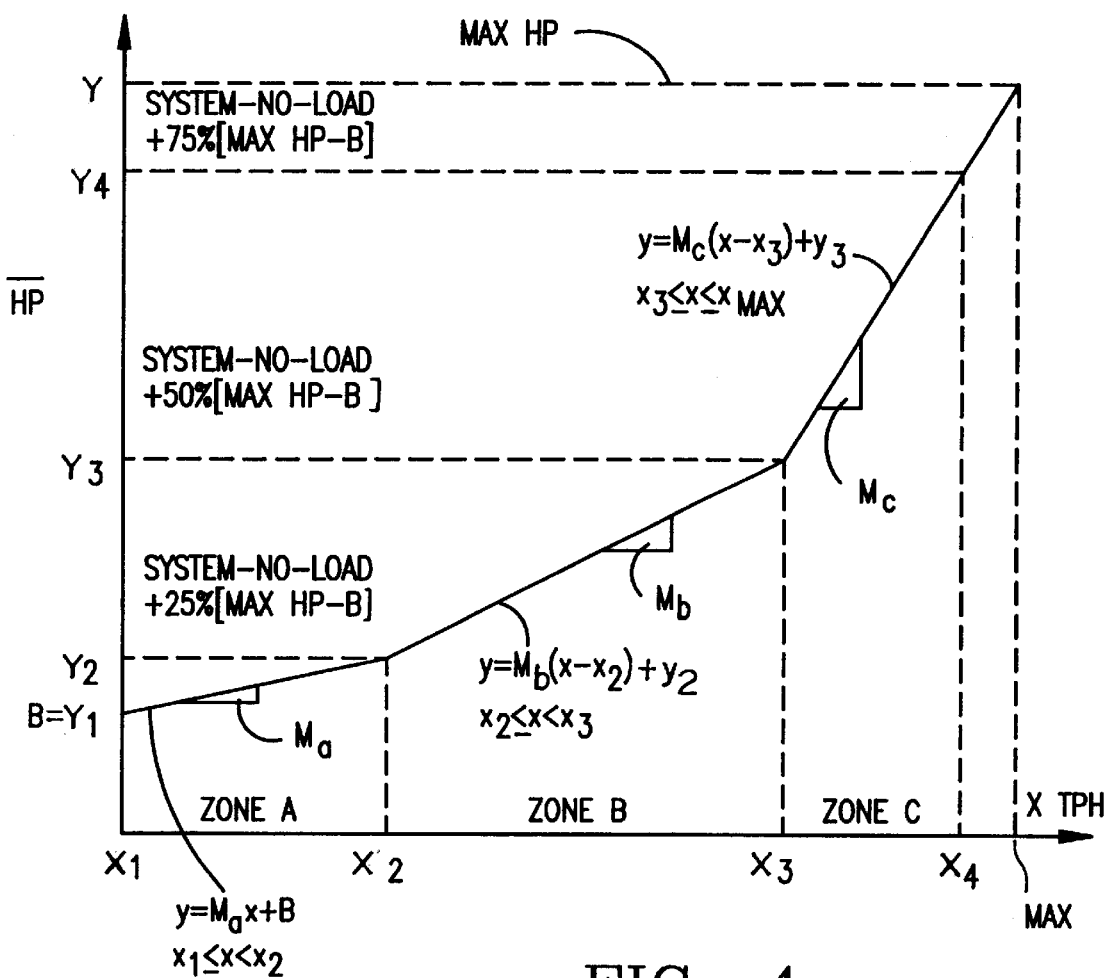
FIG. 4 is a graph of the rate flow against the power demand of the prime mover for a non-linear system.

Referring to FIG. 4, the relationship between horsepower output of the electric motor 2 and the flow rate of the material being displaced, in a system that is not substantially linear, is represented by a three-zone system approximated by three straight line segments represented by the following equations, $Y = M_a X + B$, or $X = (Y-B)/M_a$, where $M_a = (Y_2-Y_1)/(X_2-X_1)$, $Y_1 \leq Y \leq Y_2$, $Y_1 = B$, $Y = M_b(X-X_2) + Y_2$, or $X = (Y-Y_2)/M_b + X_2$, where $M_b = (Y_3-Y_2)/(X_3-X_2)$, $Y_2 \leq Y \leq Y_3$, and $Y = (X-X_3)/M_c + Y_3$, or $X = (Y-Y_3)/M_c + X_3$, where $M_c = (Y_4-Y_3)/(X_4-X_3)$, $Y_3 \leq Y \leq Y_{MAX}$.

The three-zone system can be extended to a n-zone system, where n is any integer, to approximate non-linear displacement systems to n linear zones. The larger n is, the better will be the approximation. Each zone is calibrated as described for the single-, two-, and three-zone systems above. In general, the flow rate as related to the power demand is given as follows, $X = (HP - Y_n)/M_n$, where n is the number of zones, $M = (Y_{n+1} - Y_n)/(X_{n+1} - X_n)$ is the slope of the n-th line segment, HP is the horsepower demand of the electric motor, X is the flow rate, $Y_n$ is the horsepower at the $X_n$ belt cut, and $Y_{n+1}$ is the horsepower at the $X_{n+1}$ belt cut.

As a result of the mechanical system transporting, processing or otherwise conveying the material in which the electrical motor is the prime mover, the power output of the prime mover may be related to the quantity or amount of load or material being conveyed by the above equations. The present invention translates the electrical load on the motor to the amount of material, in weight units per time, that the system is conveying or transporting.

The device 24 includes a main system program (MSP) that utilizes the linear equations disclosed in FIGS. 2, 3 or 4 to provide flow rate data from the monitored power output of the electric motor 2.

For a linear system, the equation disclosed in FIG. 2 is used. The slope M of the equation is determined from the value of $Y_1$ or B, which is the system-no-load power demand, and the actual power output of the electric motor under load and actual measurements of the material being displaced by the conveying system. Once the slope is determined, the material flow rate in weight/time or volume/time is determined by the equation from the known power output of the motor.

For a non-linear system, the equations disclosed in FIG. 3 or 4 are utilized, as appropriate, to approximate the non-linearity of the system.

The system-no-load power demand B advantageously offsets any changes in the power requirement of the system caused by normal or accelerated wear and tear on the mechanical parts of the displacement system, or the wetting and drying of conveyors operating in wet weather conditions, or when the mechanical components that have aged through the years are replaced with new parts that cause a decrease or lighter load to be impressed on the electric motor of the system. The MSP also advantageously uses the system-no-load data to detect abnormal mechanical system conditions, indicating conveying system failure, such as mechanical system failure with the conveyor belts, gear box failure, etc, thereby advantageously replacing the need for conventional mechanical or electromechanical conveyor motion sensors (sometimes called zero speed switches, rotary sensors, belt sensors, etc) that are typically used in the prior art systems.

The MSP advantageously utilizes the full-load data in the single-, two-, and three-zone system of the power output of the electric motor to detect abnormal conditions indicating mechanical system failure, jam, or an electrical overburden that is not within the operating range of the electrical system.

The MSP will now be described in detail in reference to FIGS. 5A–5N.

The following parameters are entered into the MSP via the terminal 26 for each specific application:

1. Maximum horsepower of the electric motor used.
2. Time in seconds for the system to stabilize under no load to provide the system-no-load power demand (approximately 1–2 belt revolutions for belt conveyors and bucket elevators, or the time it takes for the material to move from input to output for a horizontal screw).
3. Measured flow rate.
4. High horsepower alarm.
5. High horsepower alarm delay.
6. No-load-horsepower.
7. Number of zones.

Maximum system horsepower should be within the maximum horsepower rating of the electric motor. Maximum system horsepower is the absolute system full load condition, or maximum work that the combined electrical and mechanical system can safely provide momentarily without going into electrical or mechanical overload. It is a result of the combined effect of the electrical requirements, the mechanical system together with the maximum amount of material that the mechanical system can transport, convey, displace, etc, without overloading the motor.

The following description for the MSP will, for the sake of simplicity, take into consideration a fairly linear belt-conveying system requiring measurement in tons/hour. The power demand of the electric motor will be in horsepower. The conveyor belt speed is assumed to be fairly constant regardless of the amount of material being conveyed.

The displacing, processing, transporting, conveying system, etc, is initially allowed to run empty for a period of time until the power demand has stabilized.

Figure 5A:
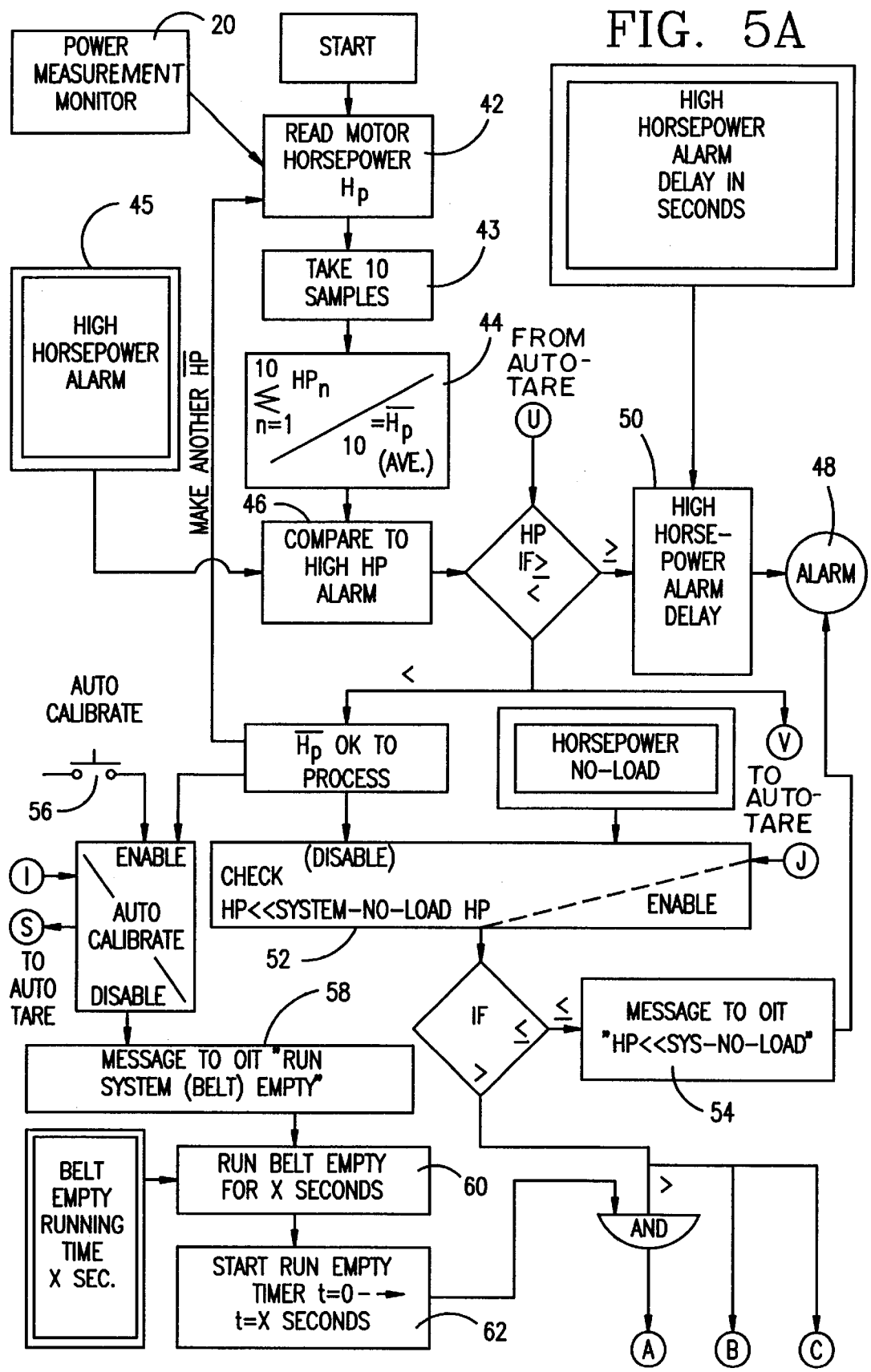
FIGS. 5A–5N is a flow-chart of a process in accordance with the present invention for determining the flow rate in terms of the power demand of the prime mover.

Referring to FIG. 5A, data from the power demand monitor 20 is fed to the MSP, which continually samples the instantaneous horsepower demand on the electric motor at step 42, taking 10 samples and averaging the readings at steps 43 and 44. Ten samples are typically taken every 5 sec. All references to horsepower that follow mean average horsepower. A high horsepower value is entered into the MSP at 45. The averaged horsepower reading is continually compared to the high horsepower alarm setting at step 46. An alarm is triggered at 48 if the horsepower reading exceeds the high horsepower alarm setting after a period of time determined by the high horsepower alarm delay at step 50. The alarm delay advantageously eliminates any false alarm caused by an isolated high horsepower value.

The monitored horsepower is verified by the system-no-load horsepower at step 52. The system-no-load horsepower is determined by the AUTO-CALIBRATE or TARE routines, which will be described below. If the monitored horsepower is below the system-no-load horsepower, an error message is sent to the terminal 26 at step 54 and an alarm is energized at 48. An alarm advantageously indicates that a fault has occurred in the conveying system. Because system-no-load horsepower is the minimum value needed to energize the system unloaded, horsepower values below that setting may indicate possible gear box malfunction; slippage or disengagement of the motor form the conveyor; a disconnect switch left open by maintenance personnel; or some possible problem involving the motor and its associated control system and power supply.

The AUTO-CALIBRATE routine is activated every time there is a new system installation or whenever the equation relating the horsepower to the flow rate has changed, such as would occur when changing the electric motor or any mechanical components of the displacement system, shrinking or stretching of the conveyor line, or adding or modifying a system hardware.

Before calibrating the system through the AUTO-CALIBRATE routine, it is important that the mechanical integrity of each component in the displacement system is in good operational condition. For example, lubricants are according to the gearbox or roller, etc. manufacturer's recommendations, and bearings and alignment are properly maintained to avoid excess friction, and general good housekeeping is kept up to date. Any mechanical condition that would cause unusual or abnormal drag on the performance of the electric motor should be corrected before the calibration of the system.

The AUTO-CALIBRATE routine is activated through a push button 56 to signal to the MSP to proceed to monitor the horsepower for a preselected time while the displacement system runs empty of the displaceable material. For a belt conveyor system, it is preferable to run the system empty for 1 to 2 complete revolutions of the belt. For other systems not employing conveyors, the system should be run empty until it has stabilized (stabilization time). The AUTO-CALIBRATE routine will identify the system-no-load horsepower after the elapsed predetermined time.

Figure 5B:
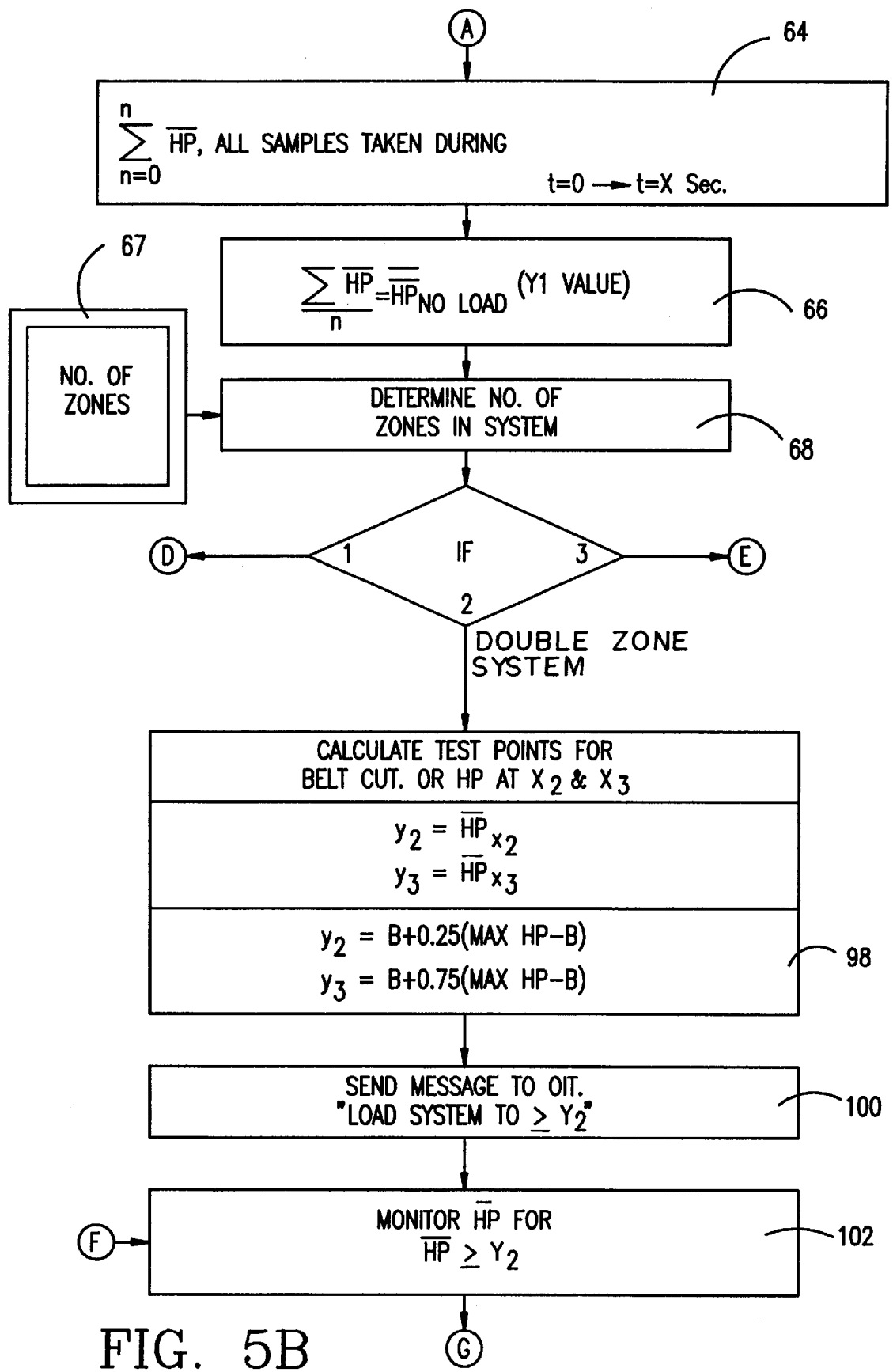

When the AUTO-CALIBRATE routine is enabled, a message is displayed at terminal 26 at step 58 to run the system empty. The system is then run for a pre-determined time at step 60. A timer is activated at step 62 for the predetermined period. The horsepower values are then sampled and summed at step 64 and averaged at step 66, which becomes the system-no-load value $Y_1$ or B, as best shown in FIG. 5B. Ten samples are typically taken for each 5 sec., and averaged. The average values are then further averaged at step 66. For a new system, the value determined at step 66 is also the no-load horsepower setting below which the MSP will cause an alarm output at 48.

The number of zones of the system is entered into the system at step 67. The MSP will then scan the number-of-zone parameter at step 68.

The next steps in the AUTO-CALIBRATE routine are to run the conveying system above system-no-load point, obtain a sample of the material being conveyed and weigh it, and calculate the flow rate from the size of the sample and the speed of the conveyor belt.

Figure 5C:
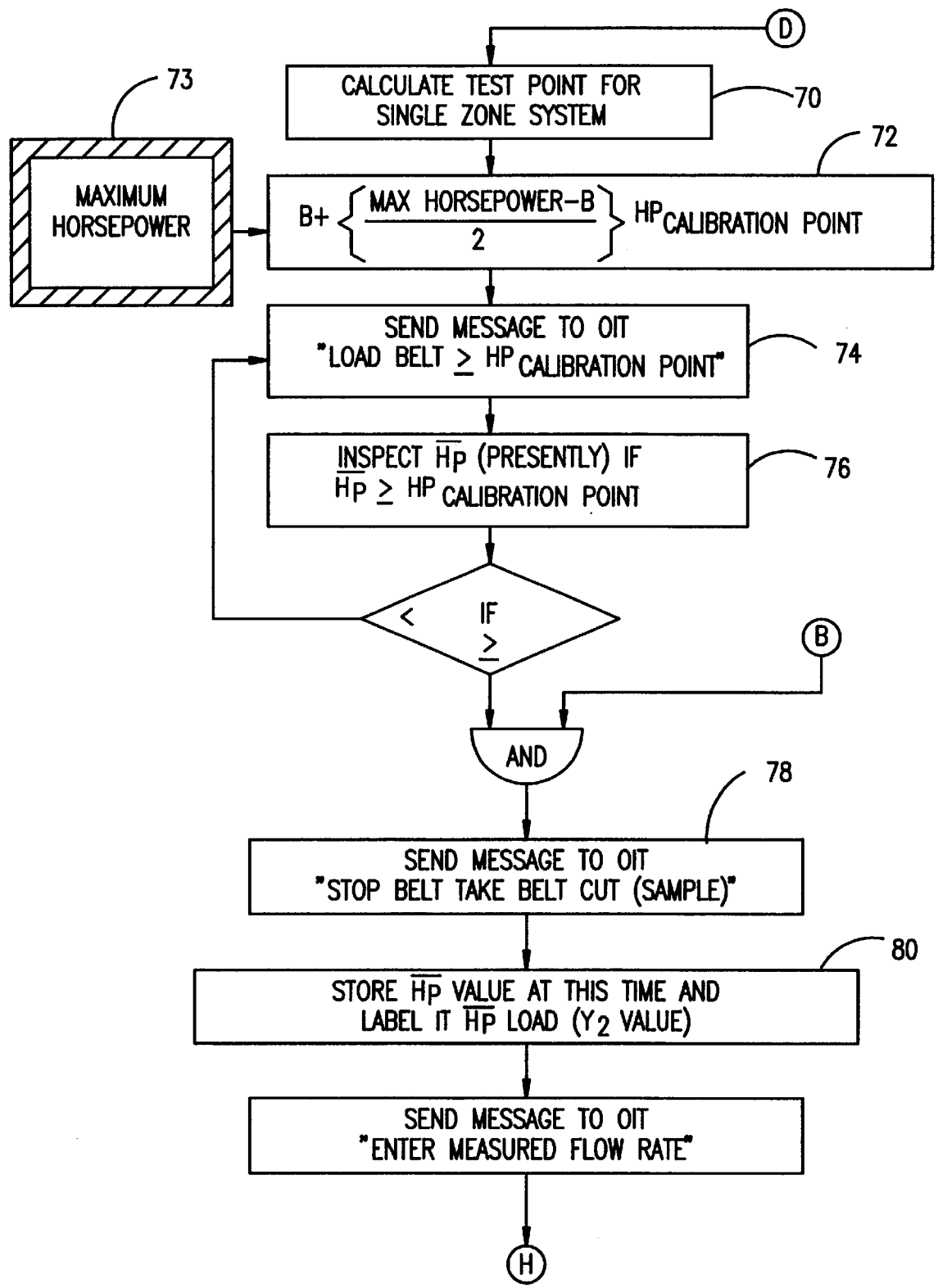

Referring to FIG. 5C, for a single zone system, as disclosed in FIG. 2, the conveying system is allowed to convey a sizable load beyond 50% of the difference between the maximum horsepower rating of the motor and the system-no-load horsepower, and then allowed to stabilize. The 50% point between the system-no-load and the maximum horsepower is determined at steps 70 and 72. The maximum horsepower is entered at step 73 and this value is used to obtain the calibration point, which is a loading point at which a belt cut will be taken. A 50% region is defined in which the conveying system must be loaded preparatory to taking samples or belt cuts of the material being conveyed. The larger the load on the system beyond the 50% point and the closer it is to the maximum load, the better the results would be in establishing the linear relationship of the horsepower to the flow rate.

The conveyor system is loaded at step 74 and the horsepower output is monitored at step 76 to insure that the loading on the system is within the 50% region. The slope of the straight line will be determined by the MSP only if the conveying system is loaded within the 50% region. The 50% region is the minimum horsepower necessary to establish the linearity of the graph for a single zone system.

The MSP will continue to monitor the horsepower while waiting to assume the proper loading constraints set by the number of zones in the system selected. When the horsepower loading on the system reaches the 50% point or greater within the region, a message is displayed to the user at step 78 to stop the conveyor and take a belt cut, as best shown in FIG. 5C.

A belt cut means stopping the conveying system and taking enough of a sample from the material on the belt to accurately determine the flow rate at that point in time. The sample must reasonable and representative of the entire belt. The longer the belt cut, the more accurate the computed material flow rate will be. An ideal sample would be to dump the entire contents of the conveyor into a container, weigh the material and divide the weight by the amount of time it took to dump the materials. The result will be an actual flow rate, such as tons/hour, of the conveyor system at a specific power demand of the electric motor, at a constant conveyor speed.

The horsepower at this point when the belt cut is taken is stored in the MSP at step 80 and the measured sample is entered at step 82 through the terminal 26. This is called the measured flow rate.

Figure 5D:
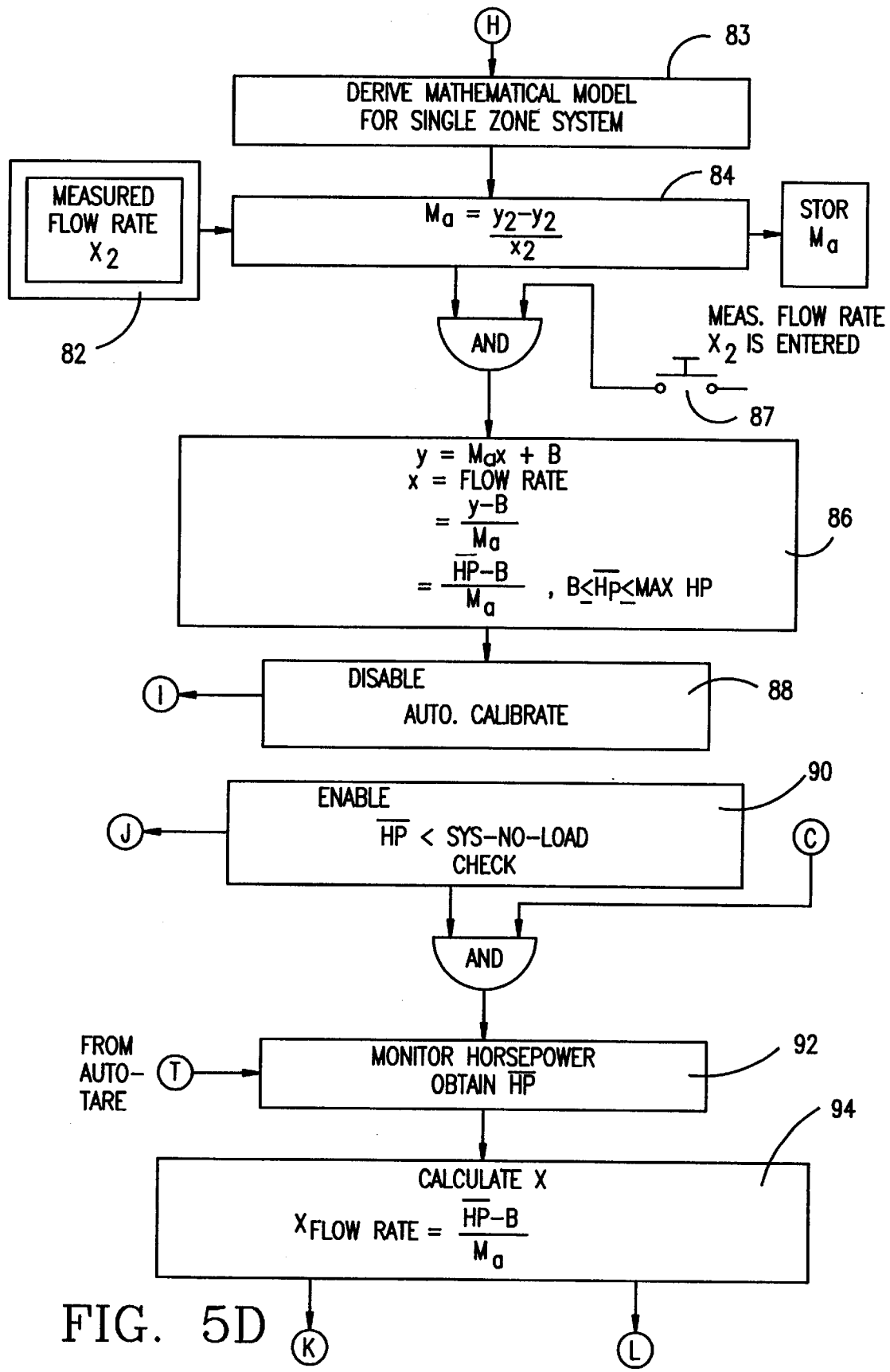

Referring to FIG. 5D, the MSP then calculates the slope of the line from the equation, $$M=(Y_2-Y_1)/(X_2-X_1),$$

where $Y_2$=horsepower at the time the belt cut or sample was taken, $Y_1$=system-no-load horsepower, $X_2$=measured flow rate at $Y_2$, and $X_1$=by definition since system-no-load is defined as horsepower demand without processing material through it.

From the equation of the line, $$Y=M*X+B,$$

the flow rate data X is calculated from the equation, $$X=(Y-B)/M, \text{ where } M=(y_2-Y_1)/(X_2-X_1), Y_1=B.$$

The derivation of the mathematical model for the single zone system is shown at steps 83, 84, and 86. Switch 87 is pressed to confirm to the system that the measured flow rate $X_2$ has been entered.

In a single zone system, the slope M is applicable for the entire range of the equation from system-no-load to maximum horsepower, where the system is fully loaded.

The AUTO-CALIBRATE routine is disabled at step 88 and the check on the horsepower relative to the system-no-load is enabled at step 90.

The MSP again enters the monitoring mode upon receiving the measured flow rate. For the single zone system, the monitoring mode is entered at step 92. The MSP processes the horsepower information by the mathematical model established for the zone at step 94 and translates the horsepower information into flow rate data for the material over the entire horsepower range of the electrical motor. The MSP converts the flow rate data to a standard industrial analog output signal, such as 4–20 ma, 0–10 V, etc., to drive the various devices 28, 32 or 34 that provides material flow rate in units of weight per unit time.

The output is also converted to a pulse train and fed to the totalizer 36. The MSP integrates the material flow rate and converts it into pulses with a proportional time base, to drive totalizer, accumulators, counters, etc. For example, 1 pulse/3,600 sec. may equal 1 ton/hour such that 1,000 pulses/3,600 sec equals 1000 tons/hour.

Referring to FIG. 5B, the AUTO-CALIBRATE routine will now be described with respect to a double-zone system.

A double-zone system is used to represent a semi-linear system, or a system that has a non-linear zone that can be approximated with reasonable accuracy by utilizing a straight line. The MSP calculates the points $Y_2$ and $Y_3$ to which the conveying system must be loaded preparatory to taking measured samples or belt cuts. These points are used to establish the slopes of the straight lines in zone A and zone B, as best shown in FIG. 3. The first point for taking the first belt cut is at, $$Y_2=B+0.25 \text{ (maximum horsepower}-B).$$

The second point is, $$Y_3=B+0.75 \text{ (maximum horsepower}-B).$$

Figure 5E:
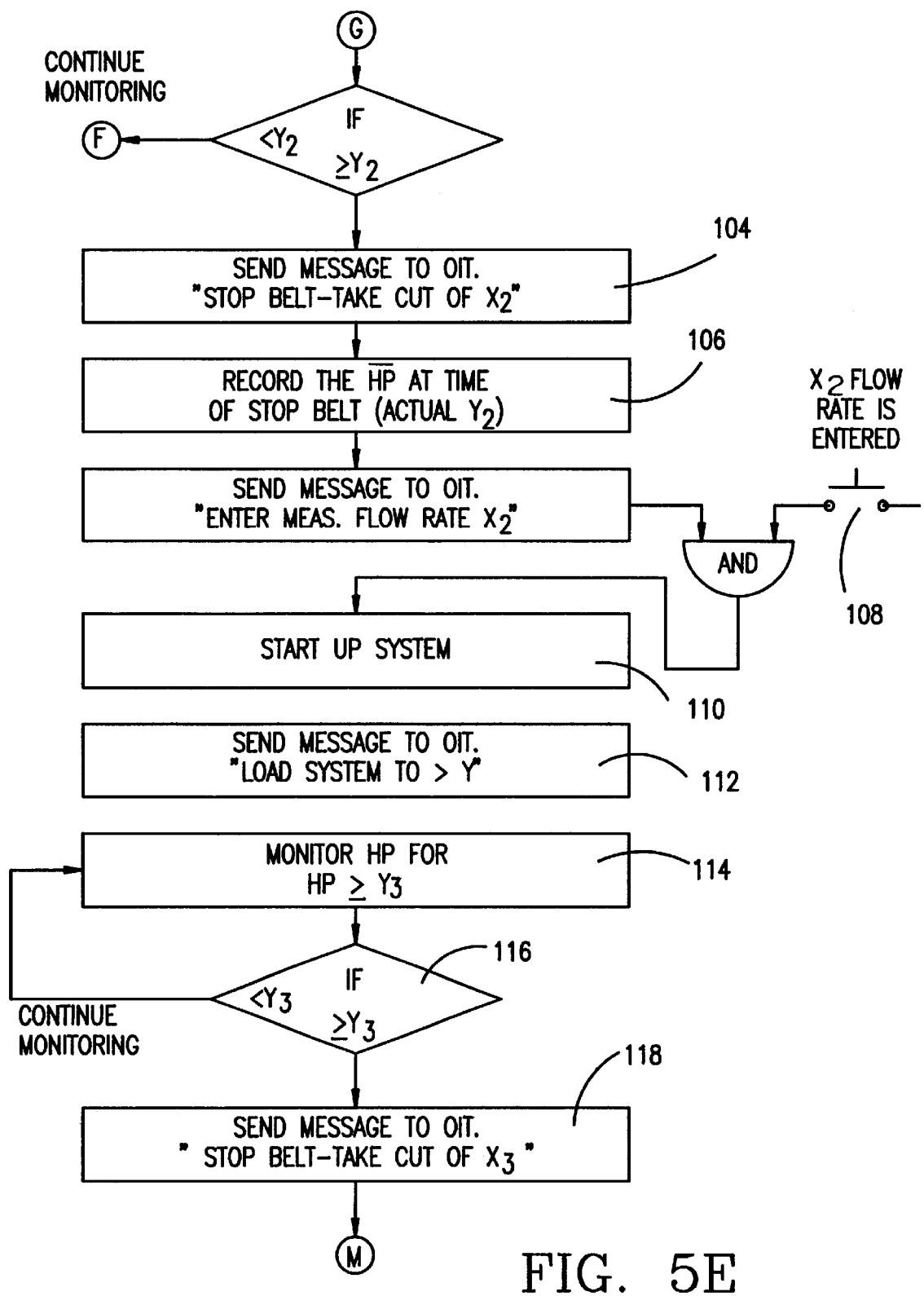

The MSP calculates these two points at step 98. A message to load the system greater than or equal to $Y_2$ is sent to the terminal 26 at step 100. It is preferable that the loading occurs at slightly greater than $Y_2$. Referring to FIG. 5E, the horsepower is monitored at step 102 until the horsepower equals or exceeds $Y_2$, at which point a message is sent to the terminal 26 at step 104 to stop the system and take a belt cut. This sample will represent $X_2$ in the straight line graph in zone A, as best shown in FIG. 3. The horsepower at $Y_2$ is recorded at step 106. The measured sample for $X_2$ is entered into the MSP at step 108 and the conveying system is restarted at step 110.

Figure 5F:
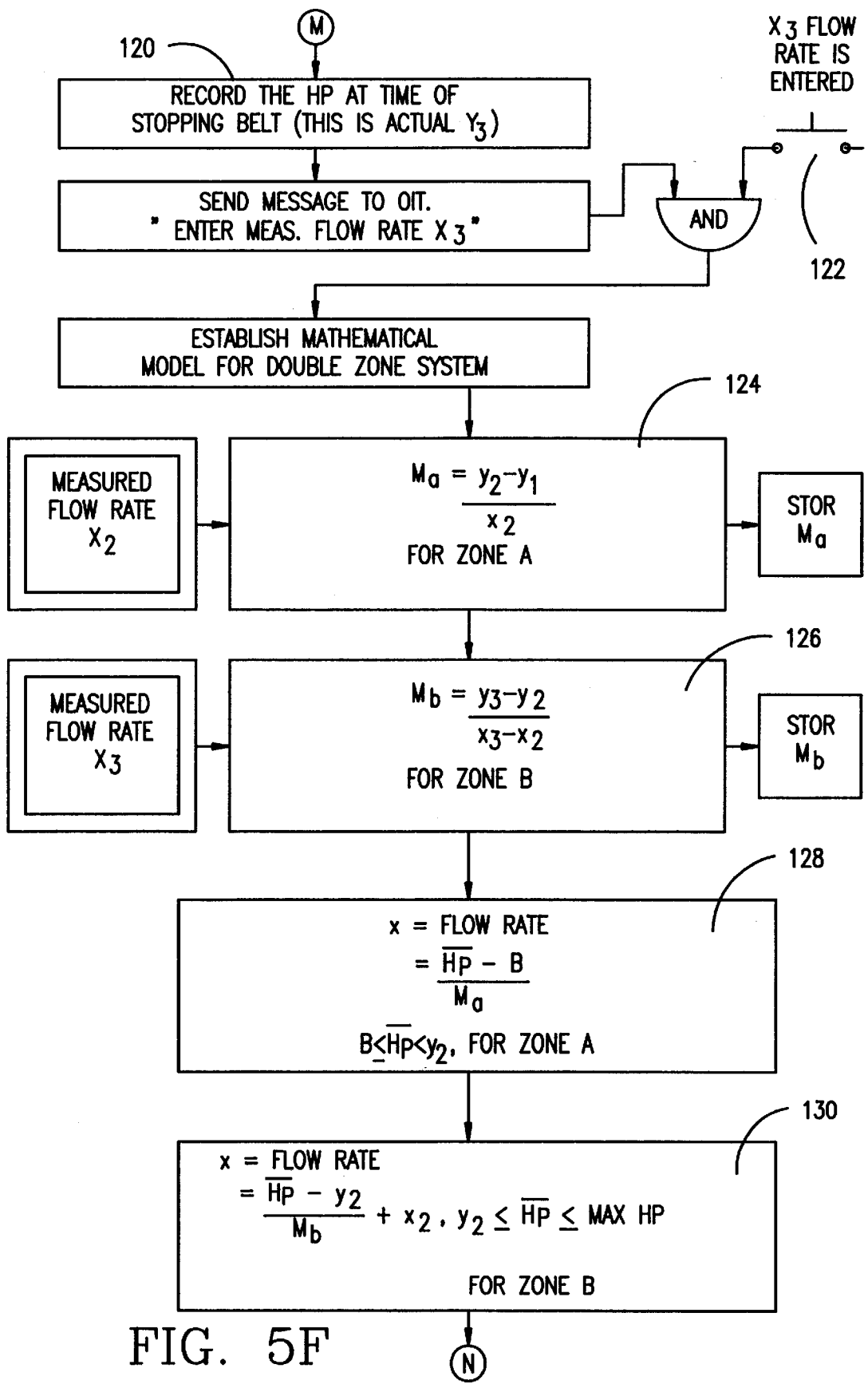

The system is then loaded until the horsepower reaches or exceeds $Y_3$ at steps 112, 114 and 116, at which point the conveying system is stopped and a belt cut is taken at step 118. Referring to FIG. 5F, the horsepower at $Y_3$ is recorded at step 120 and the measured flow rate at $X_3$ is entered into the system at step 122. The mathematical model for the double-zone system is then calculated at steps 124 and 126.

For zone A, the slope $M_a$ is calculated as follows, $$M_a=(Y_2-Y_1)/X_2,$$

where $Y_1$ is the system-no-load horsepower, $Y_2$ is the recorded horsepower at the time the belt cut for $X_2$ is taken, and $X_2$ is the actual measured flow rate from the belt cut.

The slope $M_b$ for zone B is calculated as follows, $$M_b=(Y_3-Y_2)/(X_3-X_2),$$

where, $Y_3$=the monitored horsepower for belt cut $X_3$, $Y_2$=the monitored horsepower at belt cut $X_2$, $X_3$=the measured flow rate from the belt cut at step 118, and $X_2$=the measured belt cut at step 104.

The mathematical model for the flow rate data in zone A is established at step 128 to be, $$X=(HP-B)/M_a, \text{ for } Y_1 \leq HP \leq Y_2, Y_1=B.$$

The mathematical model for zone B is established at step 130 to be, $$X=(HP-Y_2)/M_b+X_2, \text{ for } Y_2 \leq HP \leq HP_{MAX}.$$

Figure 5G:
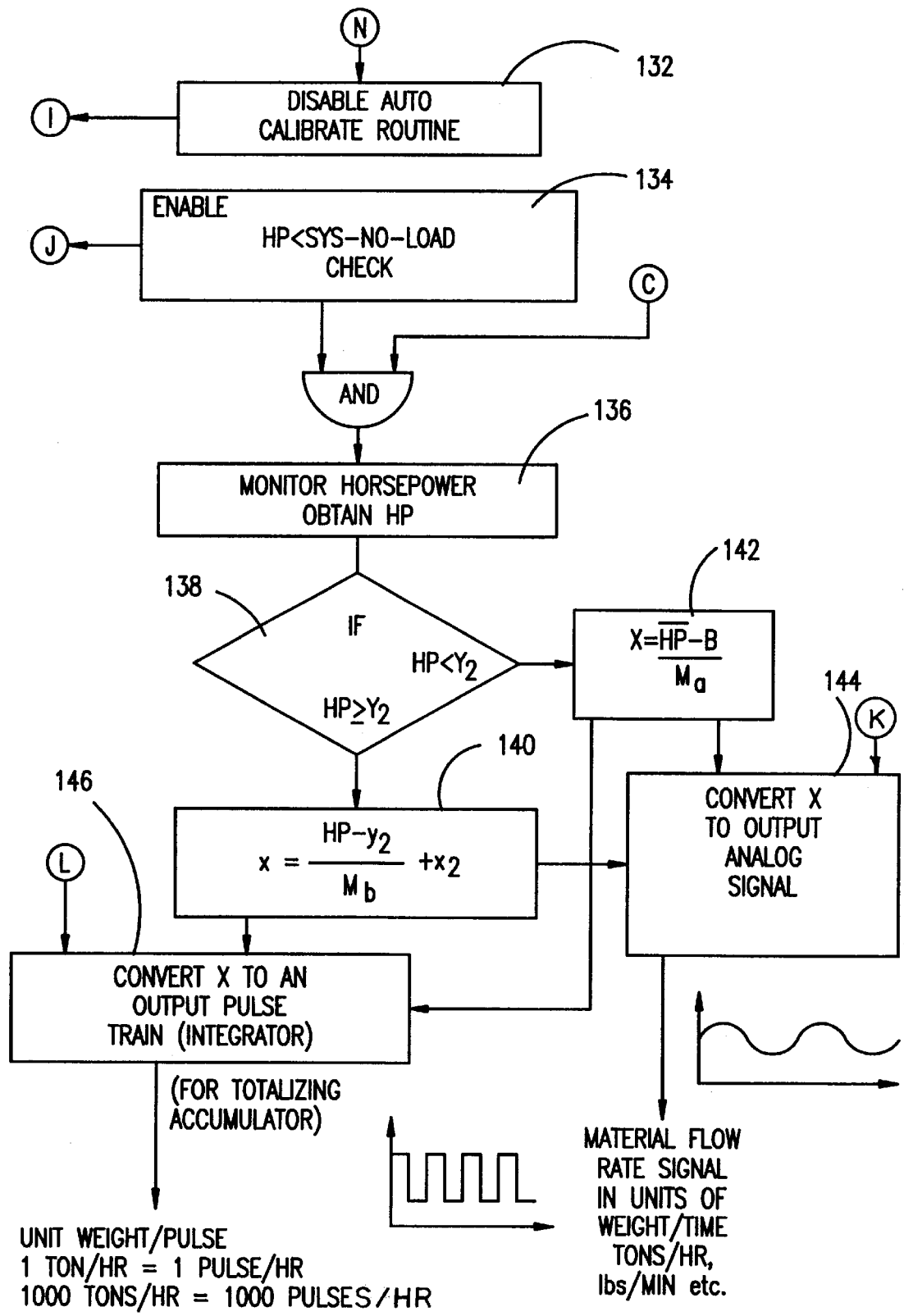

Referring to FIG. 5G, the AUTO-CALIBRATE routine is disabled at step 132 and the check on the system-no-load horsepower is enabled at step 134. The MSP now processes horsepower information by the mathematical models established for zones A and B and translates the horsepower information into flow rate data for the material being conveyed over the entire horsepower range of the electric motor, generally indicated at steps 136, 138, 140 and 142. The flow rate data is converted to an analog signal at step 144 or a pulse train at step 146, as desired.

Figure 5H:
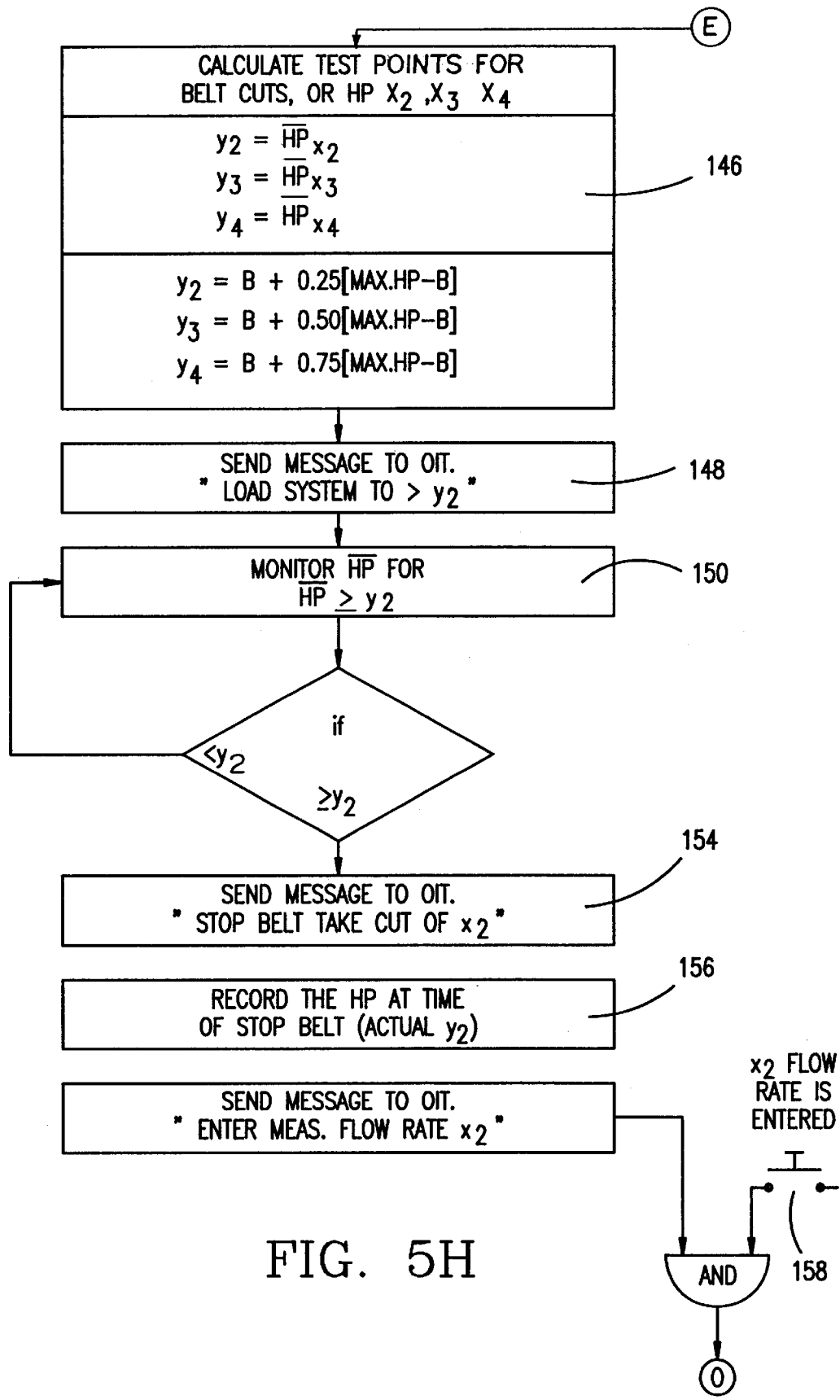

The AUTO-CALIBRATE routine will now be described with reference to the three-zone system. Referring to FIG. 5H, the MSP calculates at step 146 three points, $Y_2$, $Y_3$ and $Y_4$, at which to take actual samples from the material being conveyed, which will correspond to measured flow rates $X_2$, $X_3$, and $X_4$. The three horsepower points are calculated as follows, $$Y_2=B+0.25(\max HP-B),$$

$$Y_3=B+0.50(\max HP-B), \text{ and}$$

$$Y_4=B+0.75(\max HP-B).$$

The conveying system is loaded to convey a sizable load until the first point, $Y_2$ is reached, generally indicated at steps 148, 150 and 152. The conveying system is then stopped and a sample or belt cut is taken, which will correspond to the flow rate $X_2$, generally indicated at step 154. The horsepower is recorded at step 156 and the measured flow rate is entered at 158.

Figure 5I:
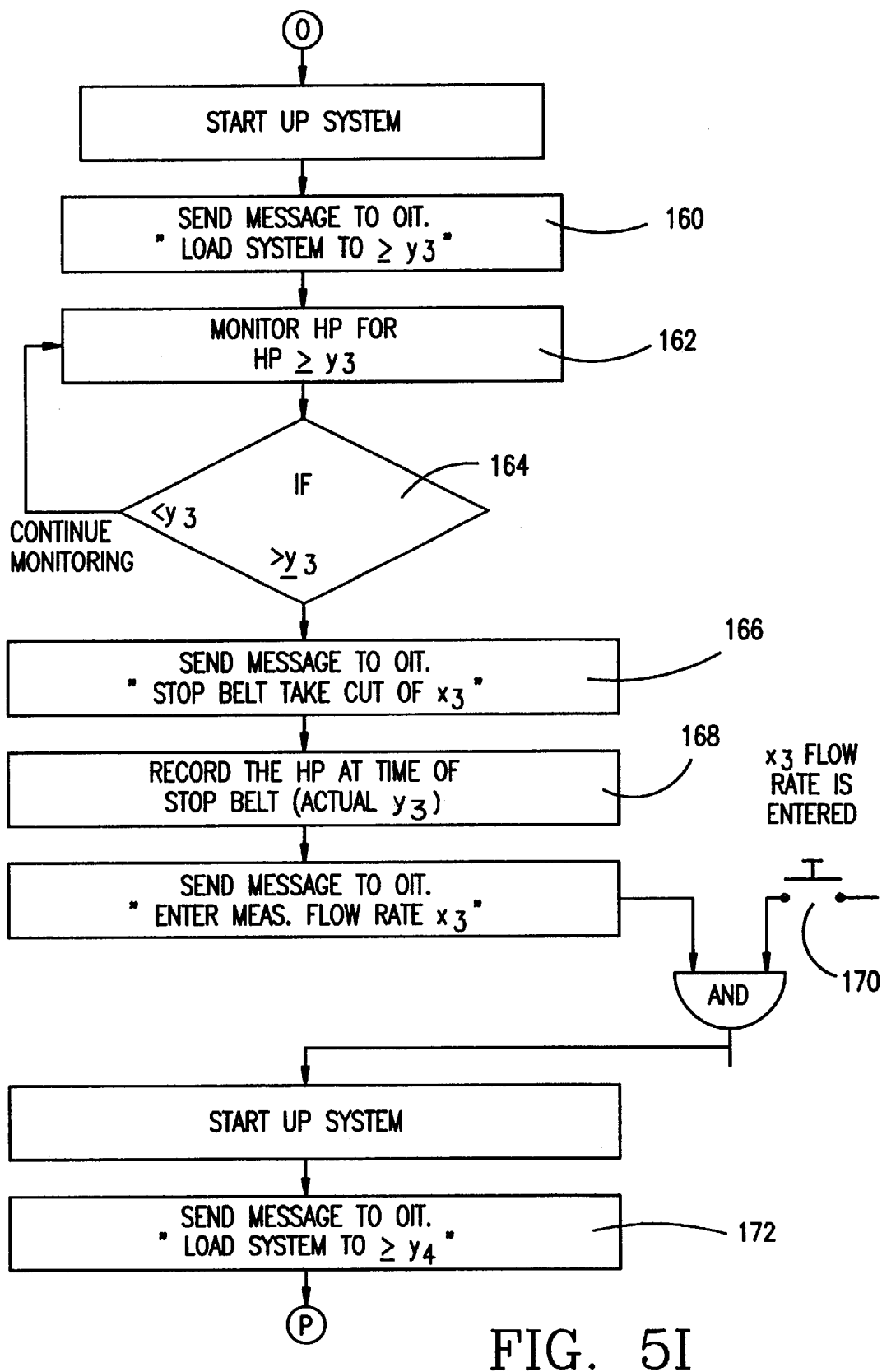

Referring to FIG. 5I, the displacement system is again loaded until the monitored horsepower reaches or exceeds $Y_3$, generally indicated at steps 160, 162 and 164. A second sample or belt cut is taken at step 166, which will correspond to flow rate $X_3$. The monitored horsepower is recorded at step 168. The measured flow rate $X_3$ is entered into the MSP at step 170.

Figure 5J:
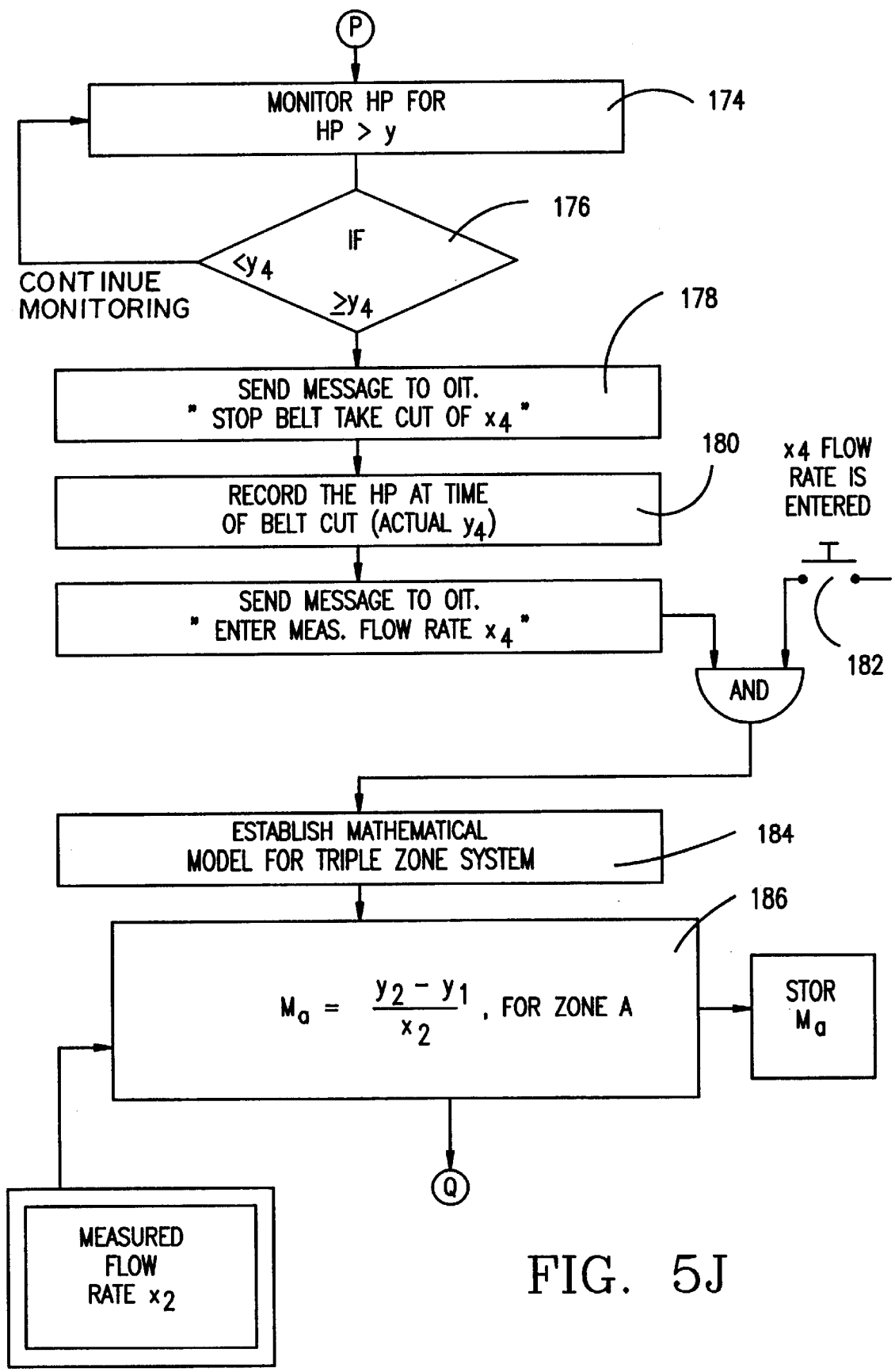
Figure 5K:
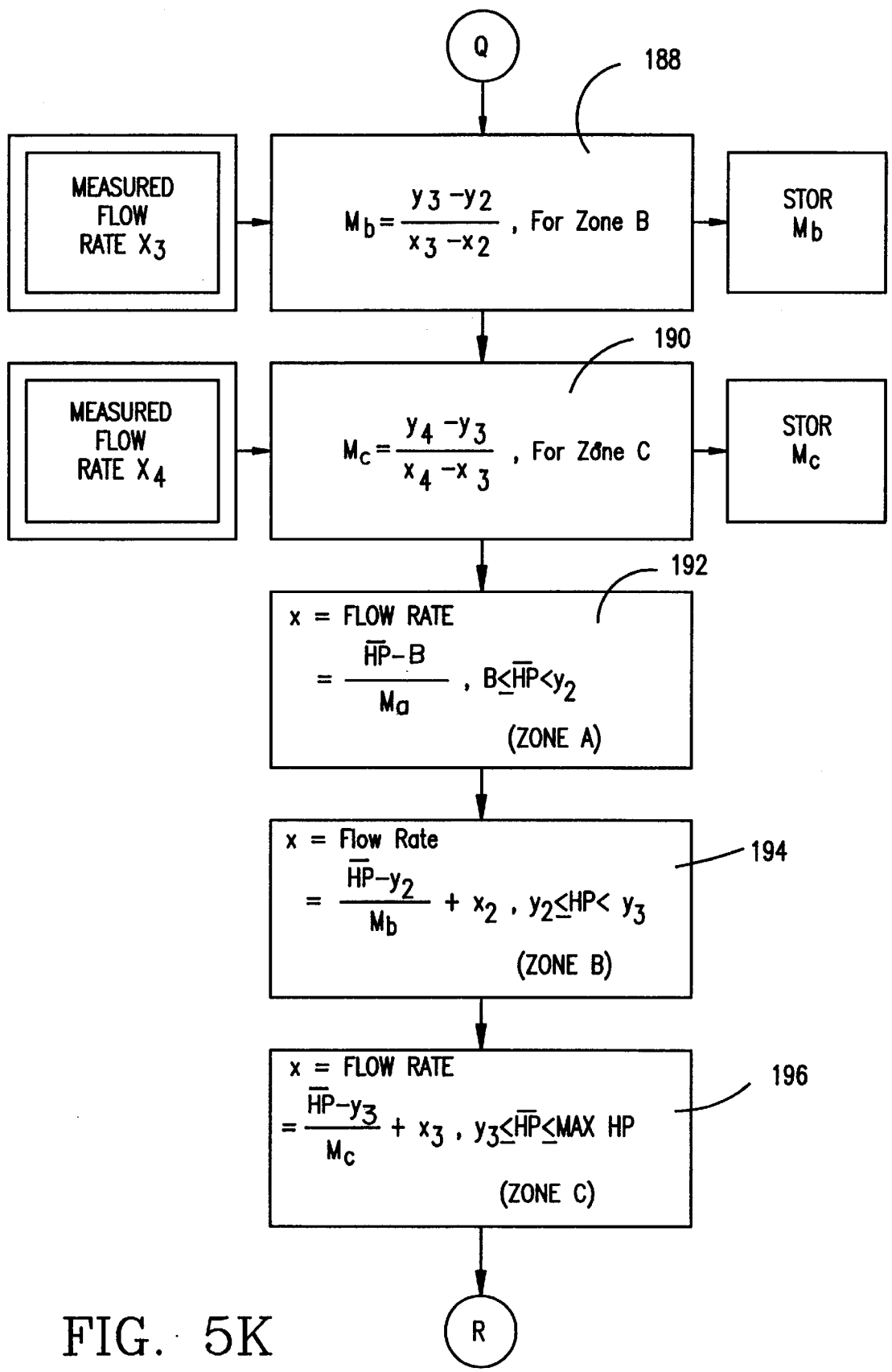

Referring to FIG. 5J, the conveying system is again loaded until the monitored horsepower reaches or exceeds $Y_4$, as generally shown at steps 172, 174 and 176. Actual measurement from the conveyor belt is then taken, which will correspond to flow rate $X_4$, at step 178. The monitored horsepower is recorded at step 180 and the measured flow rate $X_4$ is entered at 182.

The mathematical model for the three-zone system is then established by calculating the individual slope; namely, $M_a$, $M_b$ and $M_c$, generally indicated at steps 186, 188 and 190. The slopes are calculated from the following formulas, $$M_a=(Y_2-Y_1)/X_2,$$

$$M_b=(Y_3-Y_2)/(X_3-X_2), \text{ and}$$

$$M_c=(Y_4-Y_3)/(X_4-X_3).$$

The flow rate X is established at steps 192, 194 and 196 to be, $$X=(HP-B)/M_a, \text{ for } B \leq HP \leq Y_2,$$

$$X=(HP-Y_2)/M_b+X_2, \text{ for } Y_2 \leq HP \leq Y_3, \text{ and}$$

$$X=(HP-Y_3)/M_c+X_3, \text{ for } Y_3 \leq HP \leq HP_{MAX}.$$

Figure 5L:
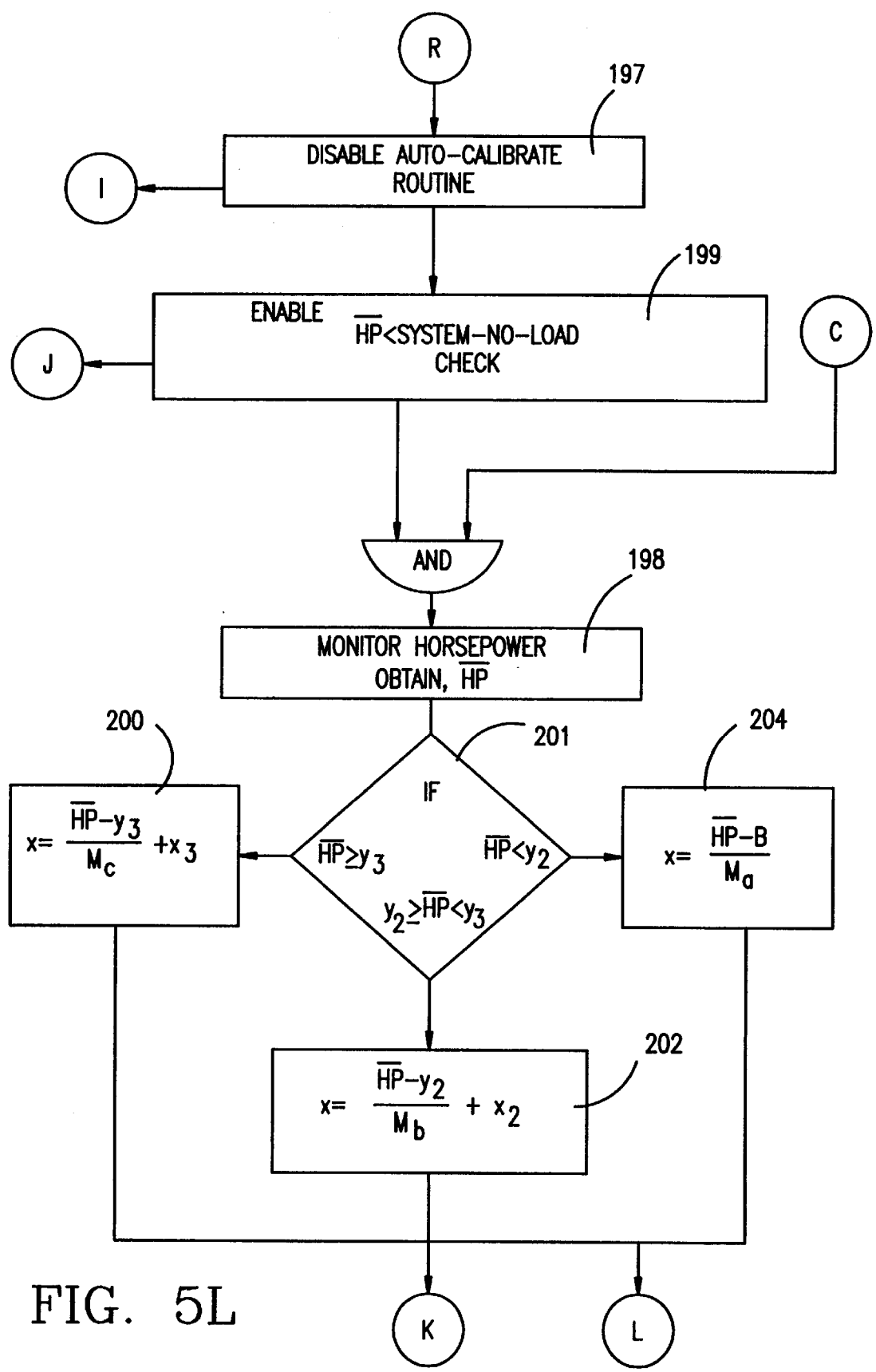
Figure 5M:
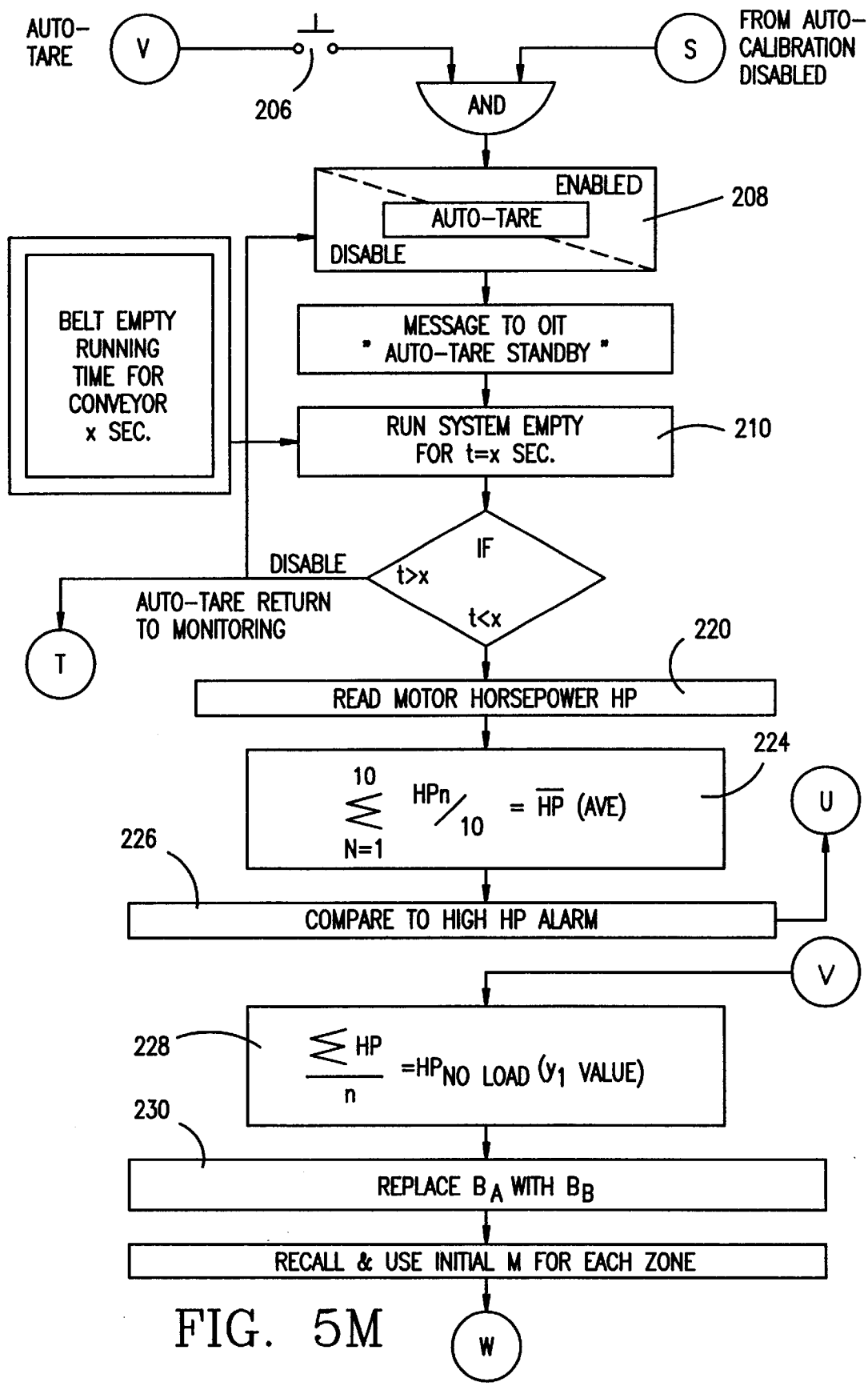

Referring to FIG. 5L, the MSP now processes horsepower information via the mathematical models established for each zone and translates the horsepower information into flow rate data for the material over the entire horsepower range of the electrical system.

The AUTO-CALIBRATE routine is disabled at step 197 and the horsepower check against the system-no-load setting is enabled at step 199.

Depending on the value of the monitored horsepower, the appropriate model is used, generally indicated at steps 198, 201, 202 and 204. The output of the MSP is then converted to an analog signal at step 144 to provide flow rate data in units of weight per unit time. A pulse train signal may also be provided at 146 to provide a totalizing output.

The MSP will constantly calculate and display the flow rate through the above equations as it monitors the horsepower from the electric motor of the conveying system. The TARE routine will now be described with reference to FIGS. 5M, 5N, and 6A–6B. The AUTO-TARE routine is used to recalibrate the system-no-load power demand to take into account any increases or decreases in the mechanical drag of the conveying system, such as when the belt is wet or dry. For example, the TARE routine should be performed after the conveyor belt has carried muddy or wet material for one belt revolution, after periodic grease and lubrication maintenance, after installing a new conveyor belt, etc. The TARE routine should also be performed at the start of each shift.

A switch 206 is energized and the AUTO-CALIBRATION routine is disabled in order to enable the TARE routine at step 208. The conveying system is then run empty for a predetermined time at step 210. The motor horsepower is read periodically during this period and averaged at steps 220 and 224. The average value is then compared to the high horsepower alarm setting at step 226. If the value is below the high horsepower setting, it is then accepted as the new no-load or system-no-load horsepower at step 228. The new value is then used for the single, two and three zone models, at step 230.

Figure 6A:
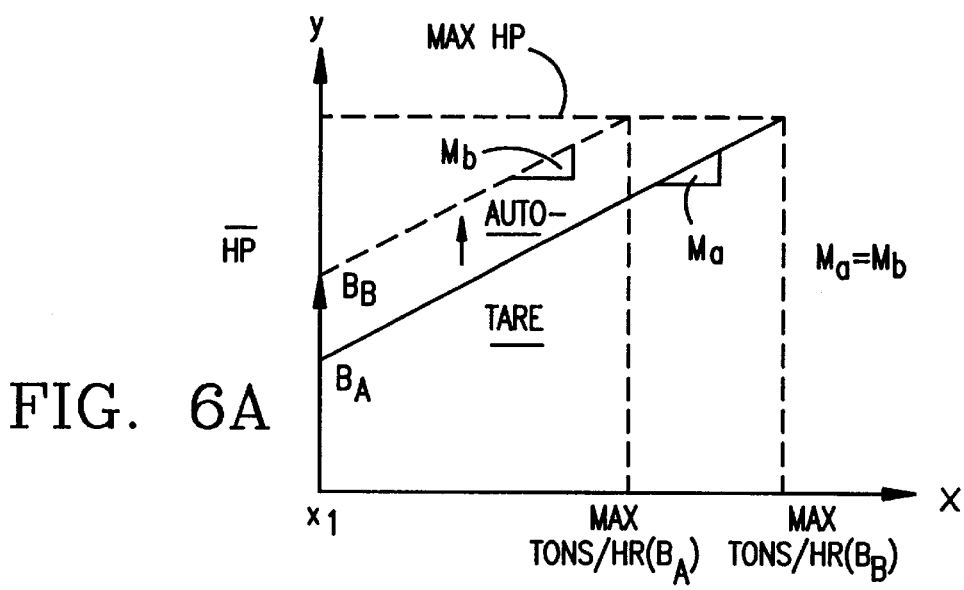
FIGS. 6A–6C are graphs of the flow rate against the power demand of the prime mover when shifted by ZERO-DRIFT algorithms in accordance with the present invention.
Figure 5N:
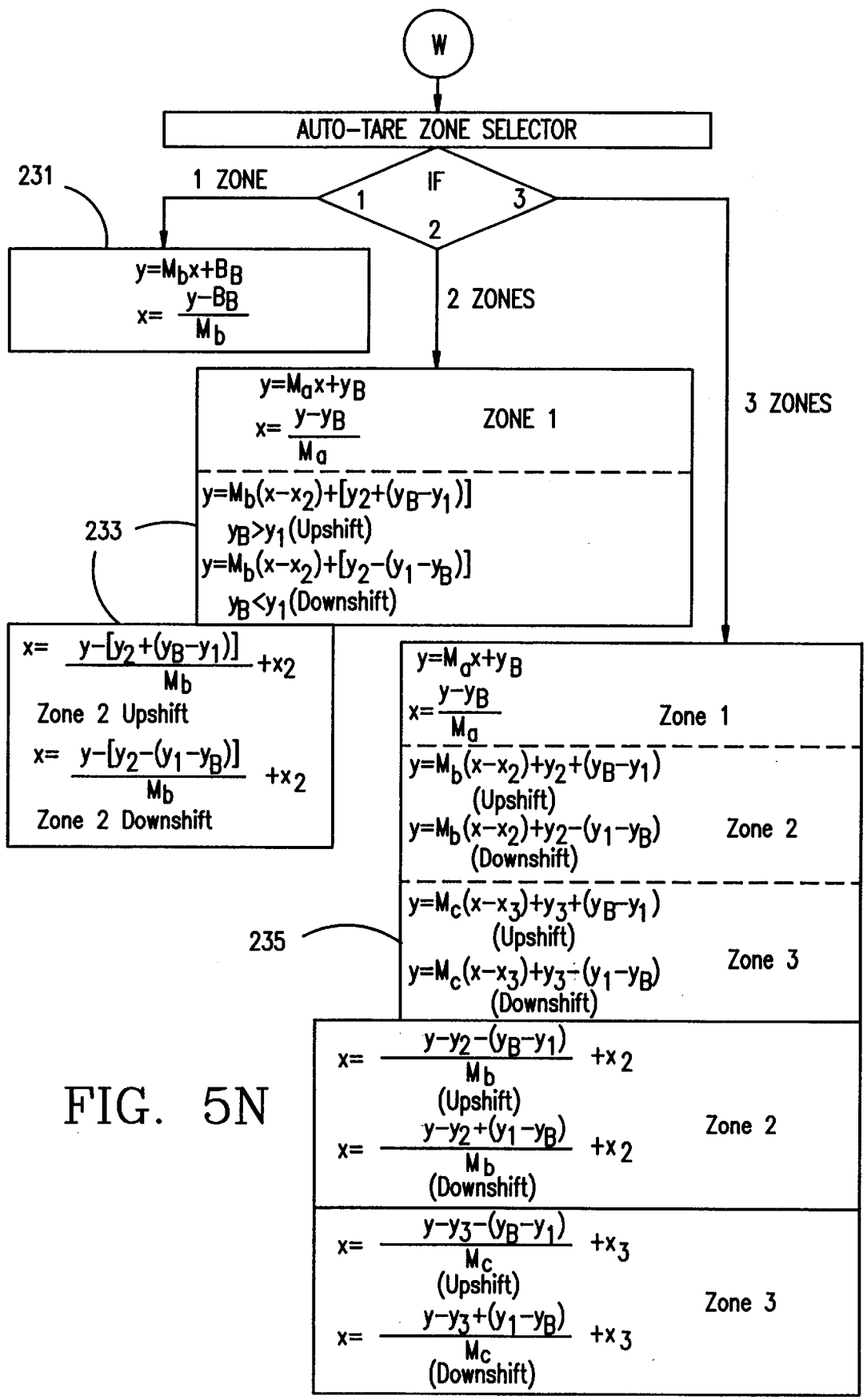

Referring to FIGS. 5N and 6A, for a single zone system, the new flow rate equation is calculated using the new system-no-load value $B_B$ at step 231.

Figure 6B:
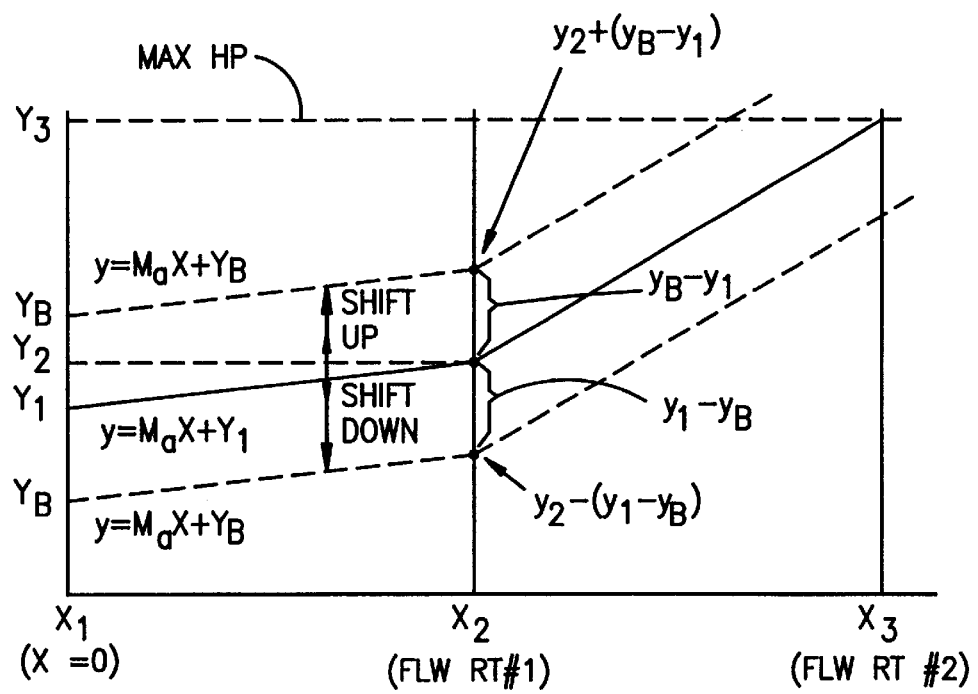

For a two-zone system, the new flow rate equation is calculated at step 233. Referring to FIG. 6B, the second zone equation is different depending on whether the new system-no-load horsepower is greater or lower than the original value.

Figure 6C:
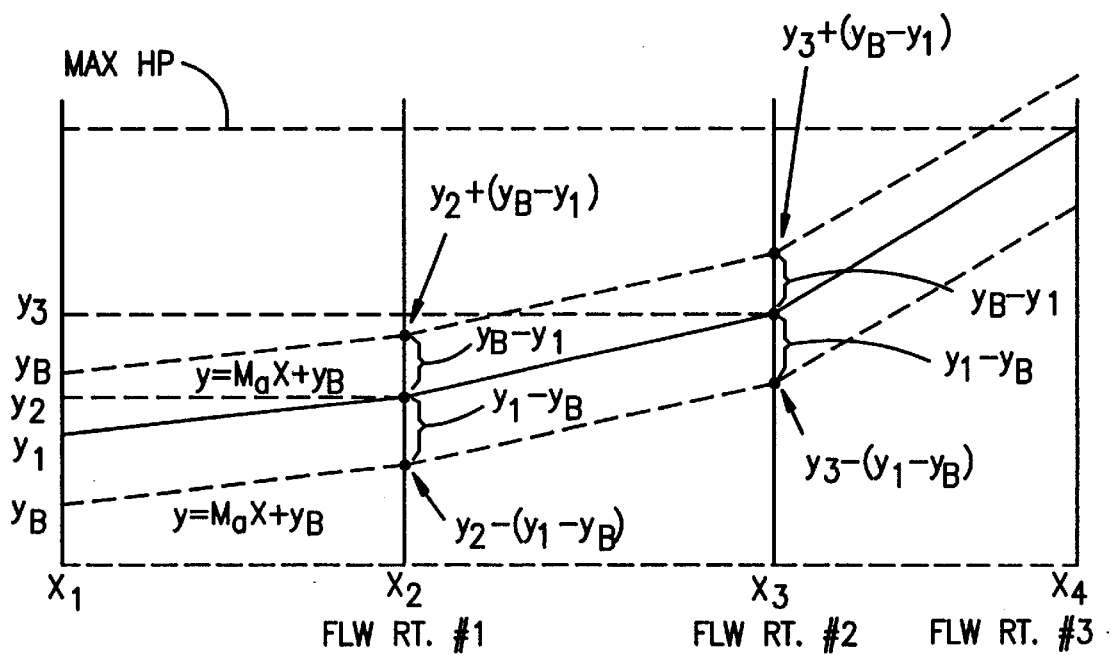

Referring to FIGS. 5N and 6C, for a three-zone system, the new flow rate equation is calculated at step 235. The second and third zone equations are different depending on whether the new system-no-load horsepower is greater or lower than the original value.

For an n zone system, the equation for the n-th line segment is, $$Y_{n-Mn}(X-X_n) + Y_n+(Y_B-Y_1), \text{ where } Y_B>Y_1(\text{upshift}), \text{ or}$$

$$Y_n=M_n(X-X_n)+Y_n-(Y_1-Y_B), \text{ where } Y_B>Y_1(\text{downshift}),$$

$$\text{where } M_n=(Y_{n+1} Y_n)/(X_{n+1}-X_n), X_1=0.$$

The TARE routine is available anytime the system is not performing an AUTO-CALIBRATE routine. The TARE routine will raise, or lower the entire graph to a new location on the Y axis, as best shown in FIGS. 6A–6C. The shift may have been caused by increase or decrease in the mechanical deadload that did not affect the slope of the line equation. The TARE routine is advantageously useful in calibrating the electrical system to any increase or decrease in mechanical drag prior to introducing material into the displacement system, offsetting or moving the entire equation to the proper system-no-load horsepower value prior to starting a production run.

Figure 7:
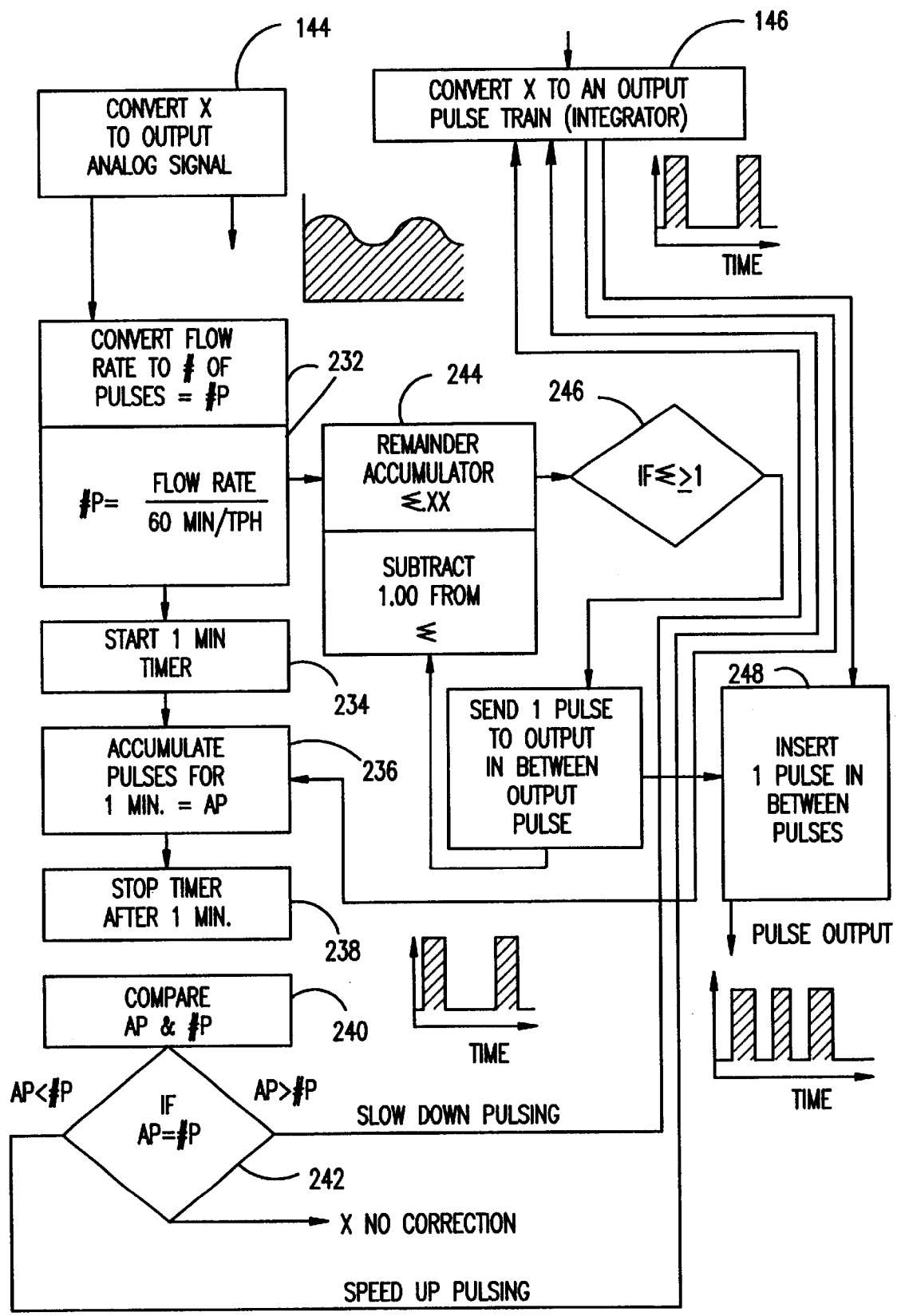
FIG. 7 is a flow-chart of a process in accordance with the present invention for automatically recalibrating the pulse output of the rate monitor to correspond to the rate output.

Referring to FIG. 7, a flow-chart is disclosed for a self-compensating integrator routine that automatically compensates or corrects the pulse output of the integrator at step 146 for the entire operating spectrum of the flow rate monitor. Once the flow rate monitor has been calibrated, the self-compensating integrator routine continuously monitors the analog rate output and ensures that the number of pulses generated at step 146 is equal to output rate. For example, for a flow rate of 100 tons/hr, the pulse output should be 100 pulses/hr, or 50 pulses/1800 sec, or 25 pulses/900 sec.

The analog output at step 146 is converted to a number of pulses equal to the flow rate X, divided by 60 min., generally indicated at step 232. The result of the division will produce a whole number, called the number of pulses #P, and a remainder .XX, whether 0.00 or some other number less than 1.00. The whole number #P is used as the target of comparison against the actual pulses AP from the output of the integrator at step 146 within a 1 min. period. A one-minute timer is started at step 234 and the number of pulses generated at step 146 is accumulated for one minute at step 236. The timer is stopped at step 238 and the number of pulses #P generated at step 232 is compared to the number AP accumulated at step 236, generally indicated at steps 240 and 242. In the meantime, the remainder XX is accumulated at step 244 until the sum equal 1.00 or greater, generally indicated at step 246, at which time one pulse is directly added to the output pulses at step 248, to be placed between pulse time or during the period when no pulses are being generated (rest time). If the accumulated pulses AP are greater than the number of pulses #P generated at step 232, the rate of pulses at step 146 is slowed down. If the accumulated pulses AP are less than the number of pulses #P generated at step 232, then the rate of pulses generated at step 146 is sped up. When the accumulated pulses equal the number of pulses generated from the analog signal, no correction is made.

The self-compensating integrator routine advantageously eliminates the common practice of recalibrating the pulse output of the integrator circuitry when operating or shifting into a different range. Thus, regardless of the range, for example, from 0.09 tons/hr (3 lbs/min) to 980 tons/hr, the pulse output will accurately include the correct number of pulses per unit time based on the analog output.

Although the present invention is described with maximum three zones, a person of ordinary skill in the art will understand that any number of zones can be utilized, limited only by practicality and manpower constraints. A three-zone model has been described above only for the sake of simplicity and to minimize the number of actual measurements that have to be taken to establish the slope of each line segment. A person of ordinary skill in the art will understand that greater accuracy will be attained with as more linear zones are utilized. Programming an n zone system would follow similar steps as disclosed with the three-zone system.

Prior art devices that employ horsepower to generate material flow rate information do not address the problems associated with drift due to mechanical warm-ups. Zero drift is inherent in practically all displaceable systems driven by an electrically based prime mover, i.e., an electric motor. It is the result of mechanical components warm-up after the system has been running for a while, which decreases the horsepower demand from a cold start. Warm-up attributable to heat produced by friction within the displaceable system or by ambient surrounding temperature gradually decreases the horsepower demand required to keep the displacement system running. Although the initial horsepower demands of the system may be higher due to cold lubricants, rubberized or plastic components in gear boxes, bearings, pivot points and conveyor belts, etc., the horsepower will gradually decrease as heat generated from mechanical friction softens these components. The softening of these components in turn decreases the horsepower requirements of the mechanical system. For example, a cold start conveyor demanding 10 HP of work from the motor of an empty displacement system, could drop to 8 HP in less than three hours. For flow rate generation systems based on horsepower, this drift, called zero drift, which is measurable when the system is running empty, produces a very pronounced reduction in derived, or calculated, material flow rate, consequently giving the appearance of decreased flow rate when in fact the actual flow rate never changed.

The zero-drift problem is illustrated in FIG. 6A. Assume that $B_B$ is system-no-load power demand when the system is first started after having been idle for several hours, for example, overnight, and $B_A$ is the system-no-load power demand after the system has been running for several hours. If the curve is not shifted downward to account for the decreased power demand, a power demand reading $Y_R$ will give an erroneous reading $X_B$, which is much lower than the accurate reading $X_A$.

It was apparent that flow rate accuracy could not be maintained throughout the entire 6–12 hr work day with temperature variations and equipment warm-ups. It was found necessary to maintain accuracy by counteracting the effects of temperature and warm-ups. Without zero drift compensation, either manually or automatically, the accuracy claimed in prior art devices, such as Snead, U.S. Pat. No. 3,942,625, using horsepower to produce flow rate information would only hold true if the system had no zero drift, or the system operated within a controlled environment. The TARE algorithm (FIG. 5M) described above is one solution to this problem. Other zero drift algorithms will now described.

In addition to the TARE algorithm, the MSP also includes AUTO-TARE, AUTO-TARE-F, SUZIE-M and SUZIE-Q-AUTOMATIC algorithms (collectively "ZERO-DRIFT" algorithms) that advantageously compensate for the effects of zero drifts.

The various zero-drift algorithms provide the user with a variety of tools for applications in horizontal screws, conveyors, bucket elevators, screens, crushers, pneumatic conveyors, etc.

The following definitions will be used in describing the zero-drift algorithms of the present invention.

1. HPPR: Present Horsepower taken from step 136 (FIG. 5G).

2. HPNL: No-Load Horsepower or B point when the system is running empty, as best shown in FIG. 6A. This is the intersection of the curve with the horsepower axis.

Figure 8:
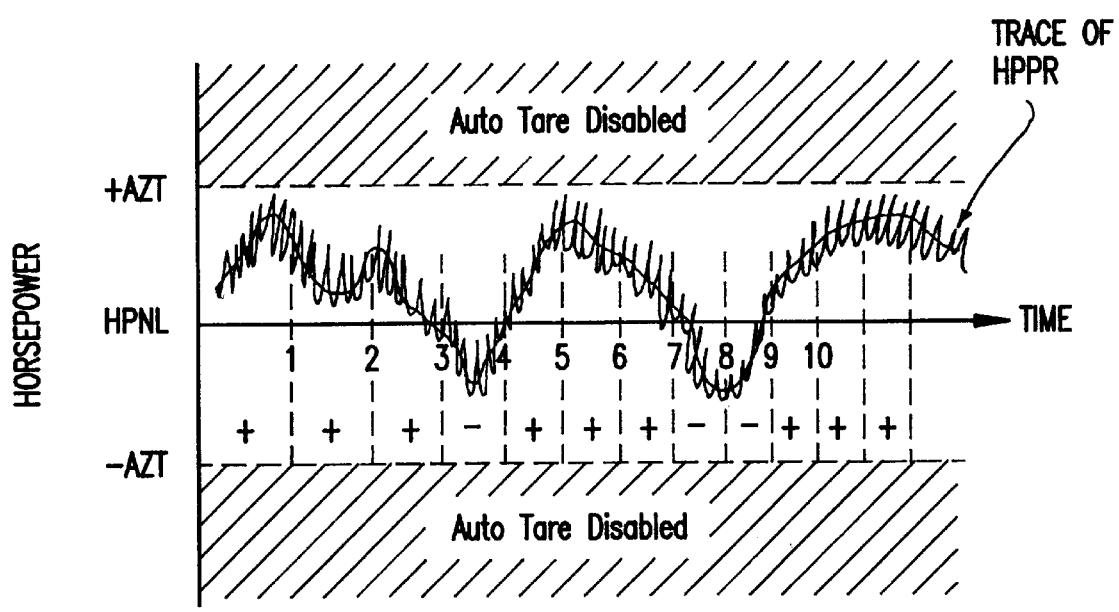
FIG. 8 is a graph of the present horsepower (HPPR) about the no-load horsepower (HPNL).

3. AZT: Automatic Zero Tracking window in horspower, centered about the HPNL. It is used by the zero-drift algorithms, as will become apparent below. Referring to FIG. 8, the window is defined by the lower limit (HPNL-AZT) and the upper limit (HPNL+AZT). The AZT window defines an area where AUTO-TARE is enabled.

The AUTO-TARE algorithm will now be described with reference to a belt conveyor as the displacement system, with the understanding that AUTO-TARE is equally applicable to other types of displacement systems.

Figure 9A:
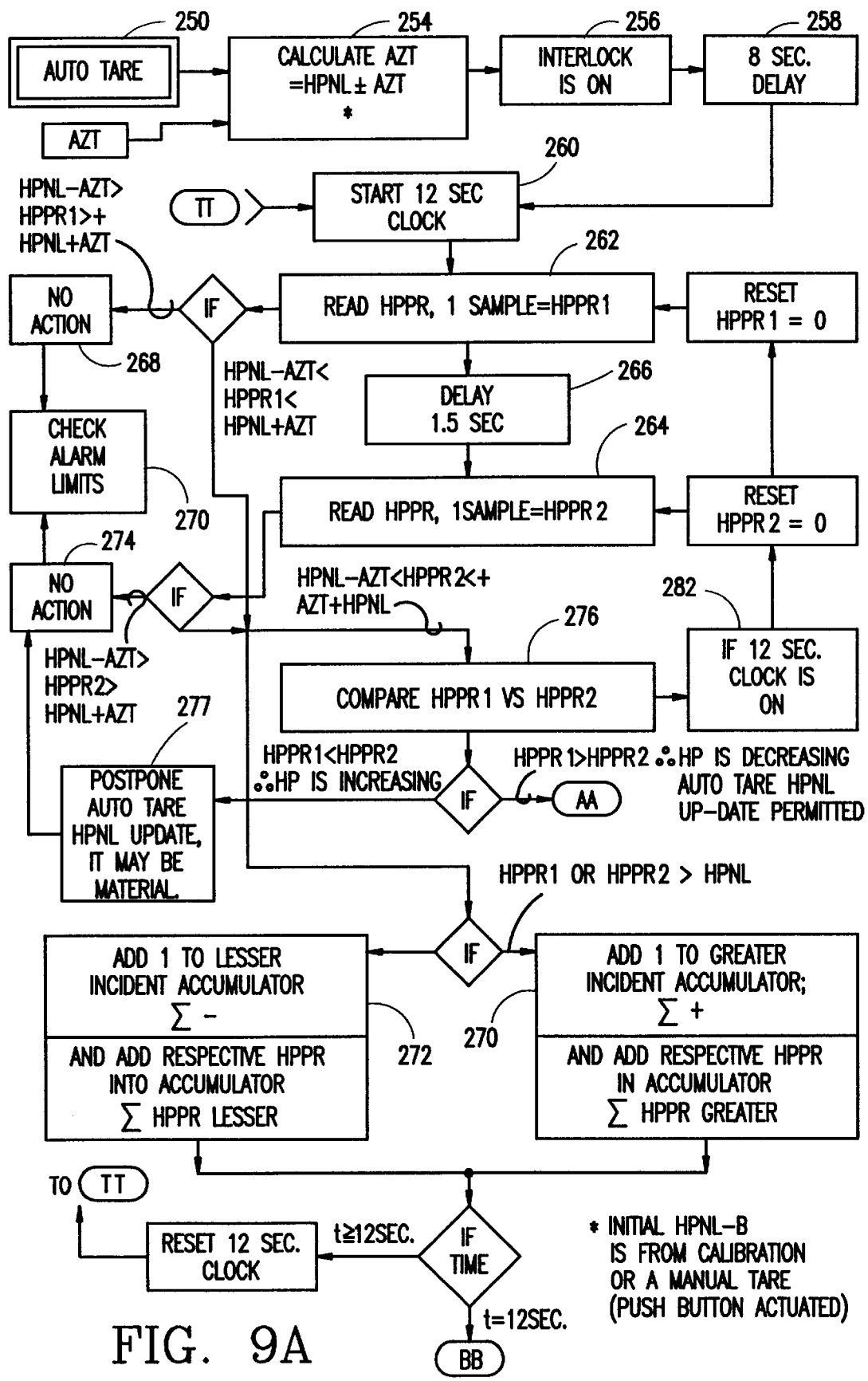
FIGS. 9A, 9B, 10, 11, 12A and 12B are flow-charts of zero-drift algorithms in accordance with the present invention.
Figure 9B:
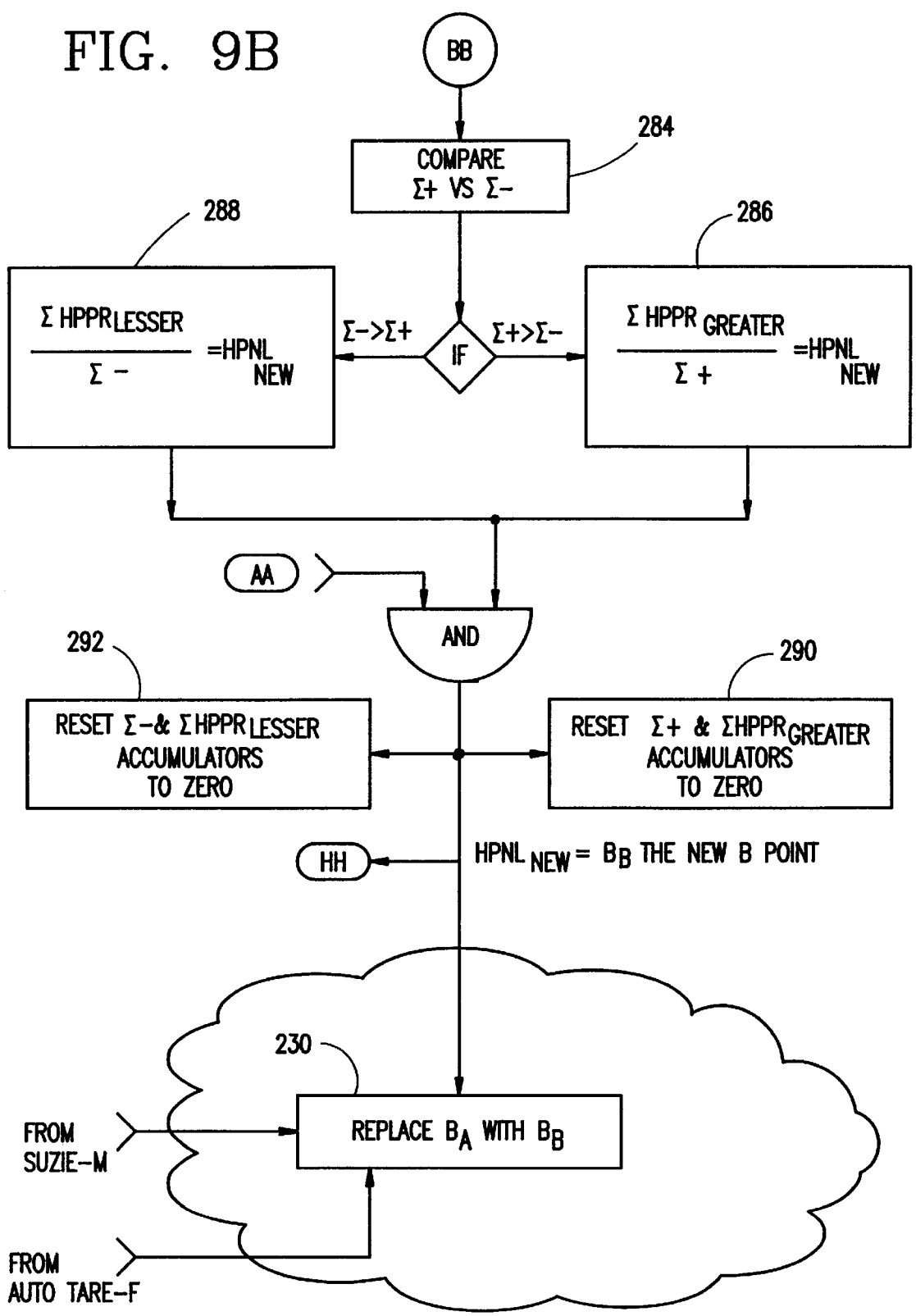

The AUTO-TARE algorithm is disclosed in FIGS. 9A and 9B. AUTO-TARE is initiated at step 250. The AZT value is entered at step 252. The algorithm calculates the AZT window at step 254. The window provides a lower limit (HPNL−AZT) and an upper limit (HPL+AZT) within which the AUTO-TARE algorithm is enabled. The algorithm then checks the interlock at step 256. The interlock is a contact associated with the MSP and is energized when the motor controller is energized to operate the conveyor motor 2. The contact is wired to the rate monitor R and provides a signal when the electric motor 2 is energized, providing an input to the MSP that the conveyor system is operating. After the motor 2 is turned on, a delay, such as 8 seconds, is provided at step 258 to by-pass any start-up surges from the motor, before the MSP starts processing the power demand from the motor. A timer, preferably set for 12 sec, is started at step 260. HPPR's, denoted HPPR1 and HPPR2, are read at steps 262 and 264 separated by a delay, preferably 1.5 sec, at step 266. HPPR is the output from step 136 (FIG. 5G). The value obtained at step 262 is designated HPPR 1 and the one at step 264, HPPR 2. IF HPPR 1 is outside of the AZT window, either above the upper limit which means there is material on the conveyor belt, or below the lower limit which means the electric motor somehow got disconnected from the conveyor belt, then no action is taken at step 268 and relevant alarm limits are checked at step 270. When HPPR falls below the lower limit of the AZT window, the event may be due to a conveyor belt that has ripped off the pulley or a gearbox broken down. If HPPR1 falls within the AZT window, and is greater than HPNL, then HPPR1 is input into the greater incident accumulator at step 270. If HPPR1 is less than HPNL, it is input into the lesser incident accumulator at step 272. HPPR2 is checked if it falls within the AZT window and if it does no action is taken at step 274. If HPPR2 falls within the AZT window, then it is either input to the greater incident accumulator or lesser incident accumulator or lesser incident accumulator, depending on whether its value is greater than or less than HPNL at steps 270 and 272. HPPR1 is then compared against HPPR2 at step 276 to determine if the values are decreasing or increasing over time. If the values are decreasing, then AUTO-TARE is permitted to proceed to update the HPNL. On the other hand, if the values are increasing, then AUTO-TARE is postponed at step 277 and no action is taken at step 274. Increasing values for HPPR means that the conveyor belt is loaded with materials, which means that AUTO-TARE cannot be performed. AUTO-TARE can only be performed when the belt is empty. If the 12 second clock is still on at step 282, then new values of HPPR1 and HPPR2 are read at steps 262 and 264 and are accumulated in the respective lesser and greater incident accumulators at steps 270 and 272. During the 12 second period, the HPPR's and the greater incident accumulator are summed, denoted $\Sigma HPPR_{GREATER}$. The number of incidents of HPPR occurring above the HPNL is also summed, denoted $\Sigma+$. Similarly for the lesser incident accumulator, the HPPRs are summed to arrive at a value called $\Sigma HPPR_{LESSER}$ and the number of incidents of HPPR occurring below the HPNL is also summed to arrive at a value called $\Sigma-$. At the end of the 12 second period, the number of incidents $\Sigma+$ is compared with the number of incidents $\Sigma-$ at step 284. If $\Sigma+$ is greater than $\Sigma-$, which means that the number of swings above HPNL is greater than the number of swings below HPNL, then the algorithm averages the HPPR values in the greater incident accumulator to arrive at a new HPNL at step 286. If $\Sigma-$ is greater than $\Sigma+$, meaning that the number of swings below HPNL is greater than the number of swings above, HPPR values in the incident accumulator are averaged at step 288 to arrive at a new HPNL which is then used to replace the existing no-load horsepower with a new value B at step 230. The respective accumulators are reset at steps 290 and 292.

Replacing the HPNL value at step 230 slips or shifts the straight line without changing the slope of the line, either up or down depending upon the magnitude of the new HPNL compared with the previous HPL, as best shown in FIG. 6A. This advantageously compensates for zero drifts every time the displacement system is detected by the MSP to be running empty or purged of material.

Initially the MSP will disable AUTO-TARE and wait to see that if in fact the swing of HPPR will go beyond the upper limit AZT window, indicative of material loaded into the system or if HPPR would return back toward the lower limit, indicative of the system being unloaded. Every time HPPR goes in the direction of greater horsepower, MSP disables AUTO-TARE within the AZT window, to advantageously anticipate from the progressive increasing positive HPPR that material is being loaded onto the conveyor. Once the HPPR goes beyond the upper limit (HPNL+AZT), AUTO-TARE remains disabled until the HPPR starts decreasing toward the lower limit and reaches the lower limit. Therefore, anytime the conveyor is started with material on the conveyor belt, or in a loaded condition, AUTO-TARE is immediately disabled because HPPR would immediately go beyond the upper limit (HPNL+AZT) upon start.

AUTO-TARE is enabled once HPPR is equal to or less than the lower limit (HPNL−AZT) and is returning from the direction of the upper limit (HPNL+AZT), and remains active when HPPR is within the window (HPNL±AZT). However, AUTO-TARE is disabled even if HPPR is within the AZT window any time HPPR goes positive, indicative of material being loaded onto the conveyor.

The MSP unlocks the AUTO-TARE algorithm only after HPPR has equaled or fallen below the lower limit (HPNL−AZT) to catch the trailing, residual material coming off the belt. AUTO-TARE is also disabled when HPPR is equal to or less than motor no-load horsepower value, which is the value of the electric motor running disconnected from the conveyor system.

Once AUTO-TARE is selected at step 250 the system will automatically go into AUTO-TARE when the algorithm senses that the system is purged of material any time during use, which could be several times during a normal shift, advantageously adjusting automatically the system-no-load horsepower or B point of the curve to compensate for changing conditions during the shift.

Figure 10:
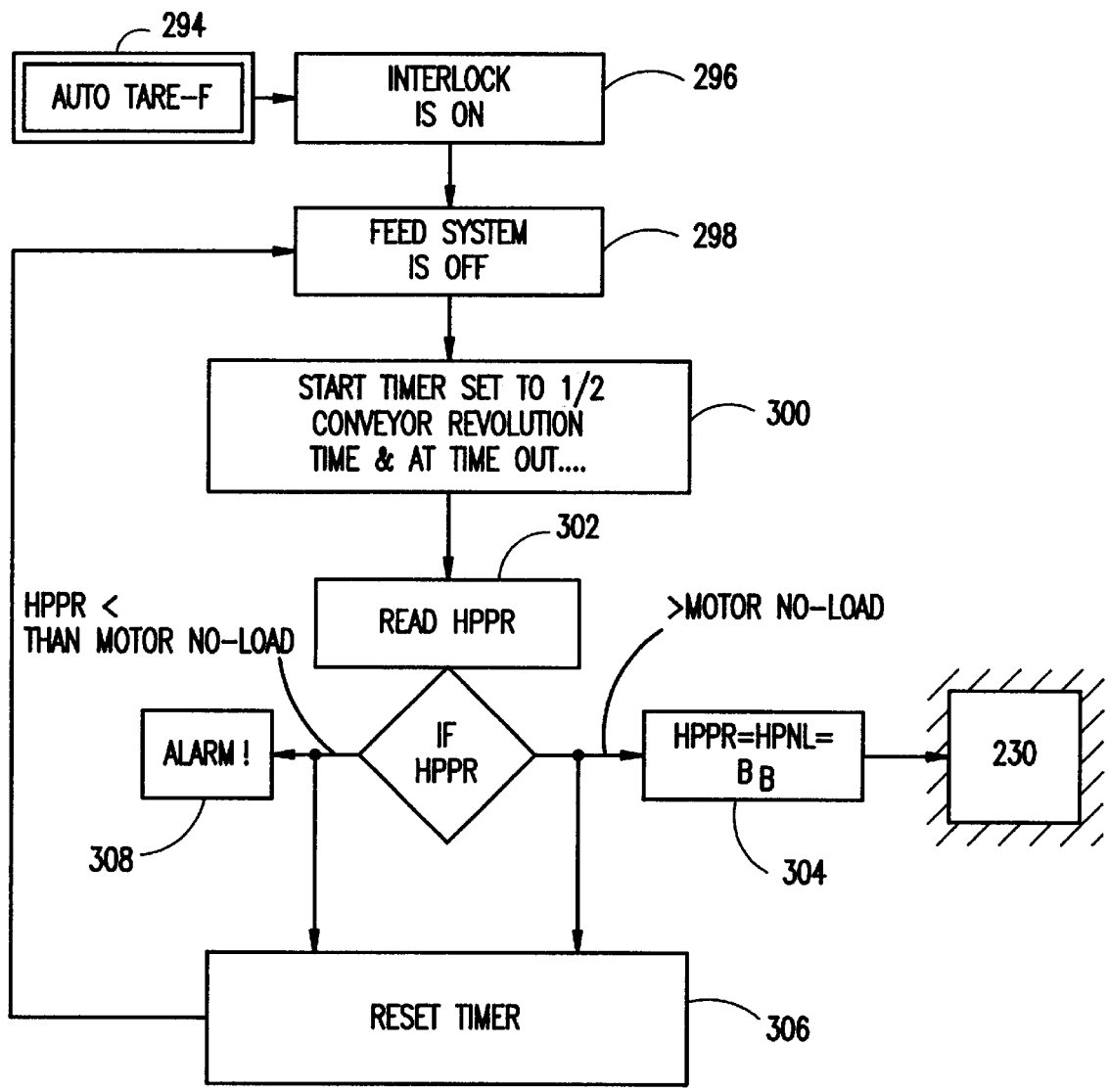

The AUTO-TARE-F algorithm will now be described in reference to FIG. 10. AUTO-TARE-F advantageously insures that the displacement system tares off prior to loading at start-up or shut-down if the system is purged of material. AUTO-TARE-F is also used if it is desired to tare the system in one half the conveyor revolution time only.

In an application where the conveyor is fed from another electrically powered feed mechanism, it is well known that the feed mechanism would have a start/stop controller/contactor which can be used to provide an input signal to operate the AUTO-TARE-F algorithm. A standard contact, such as a non-voltage isolated contact or "Form C" contact, is wired to the MSP, to provide an input when the feed mechanism is off, meaning the conveyor belt is empty or will soon be. The logic of the form C contact would be normally closed. When the feed mechanism is on and operable, the contact is open and AUTO-TARE-F is disabled. When the feed system is off, the contact closes which causes a timer, set at one-half revolution time of the conveyor belt, to start. AUTO-TARE-F is forced on at time out of the timer and zeros off the entire system and remains on until the MSP senses material load at which time the MSP disables AUTO-TARE-F and automatically returns to AUTO-TARE mode.

AUTO-TARE-F is selected at step 294. The interlock is on at step 296, which means that the conveyor system is running. The feed mechanism is off at step 298 which causes a timer set to one-half the conveyor revolution time to start at step 300. At the end of the timer period, the conveyor belt would have dumped its load if it was not empty at the start. The algorithm reads the HPPR at step 302 and if the value is greater than motor noload, then HPPR is made equal to HPNL at step 304 and is used to replace BA at step 230. The timer is reset at 306 and the cycle is repeated if the feed mechanism is still off. If the HPPR is less than motor no-load, an alarm is activated at step 308. Motor-no-load is the motor horsepower demand when the motor is disconnected from the conveyor system.

The SUZIE-M and SUZIE-Q-AUTOMATIC algorithms advantageously provide zero-drift compensation to the system even while the system is loaded with material and without the need to purge the conveyor of materials, as is the case with the other algorithms discussed above. The following definitions will be used in the description.

1. HPC: Cold-start horsepower. This is HPNL of the motor when the displacement system is started cold, such as after being off overnight. HPC would generally vary between the seasons. Generally, for a conveyor belt system, HPC in the winter will higher than in the summer. HPC is determined by running the system empty from cold start and observing the horsepower demand.

2. HPW: Warm-up Horsepower. This is HPNL of the motor after the displacement system has run for sufficient period of time for the system to warm up such that HPNL remains relatively steady. HPW would generally vary between the seasons. Generally for a conveyor belt system, HPW in the winter will be higher than in the summer. HPW is determined by running the system empty or loaded for about three hours, in the case of a conveyor belt system, unloading the material and then observing the horsepower demand. HPW will usually be considerably lower than HPC due to the warm-up of the conveyor system.

3. TA: Active Timer. This is a pre-selected period for running the displacement system to allow the motor HPNL to reach HPW. The period would vary between different systems, such as conveyors, screws, buckets, etc. For a conveyor belt system, 3 hours was found to be sufficient.

4. TO: Off Timer. This is a pre-selected time during which the displacement system is off and during which the system is allowed to cool down. When the displacement system is started after TO, the motor HPNL is HPC. For a belt conveyor, about 2 hours off time would cause the system to become cold.

5. INTERLOCK: Refers to a contact interlocked to the conveyor motor controller to provide a status of the state of conveyor motor, whether it is on or off. Interlock on means that the contact is on and that the conveyor motor is on. Interlock off means the contact is of and that the motor is off. The contact provides an input to MSP on the state of the conveyor motor.

Figure 11:
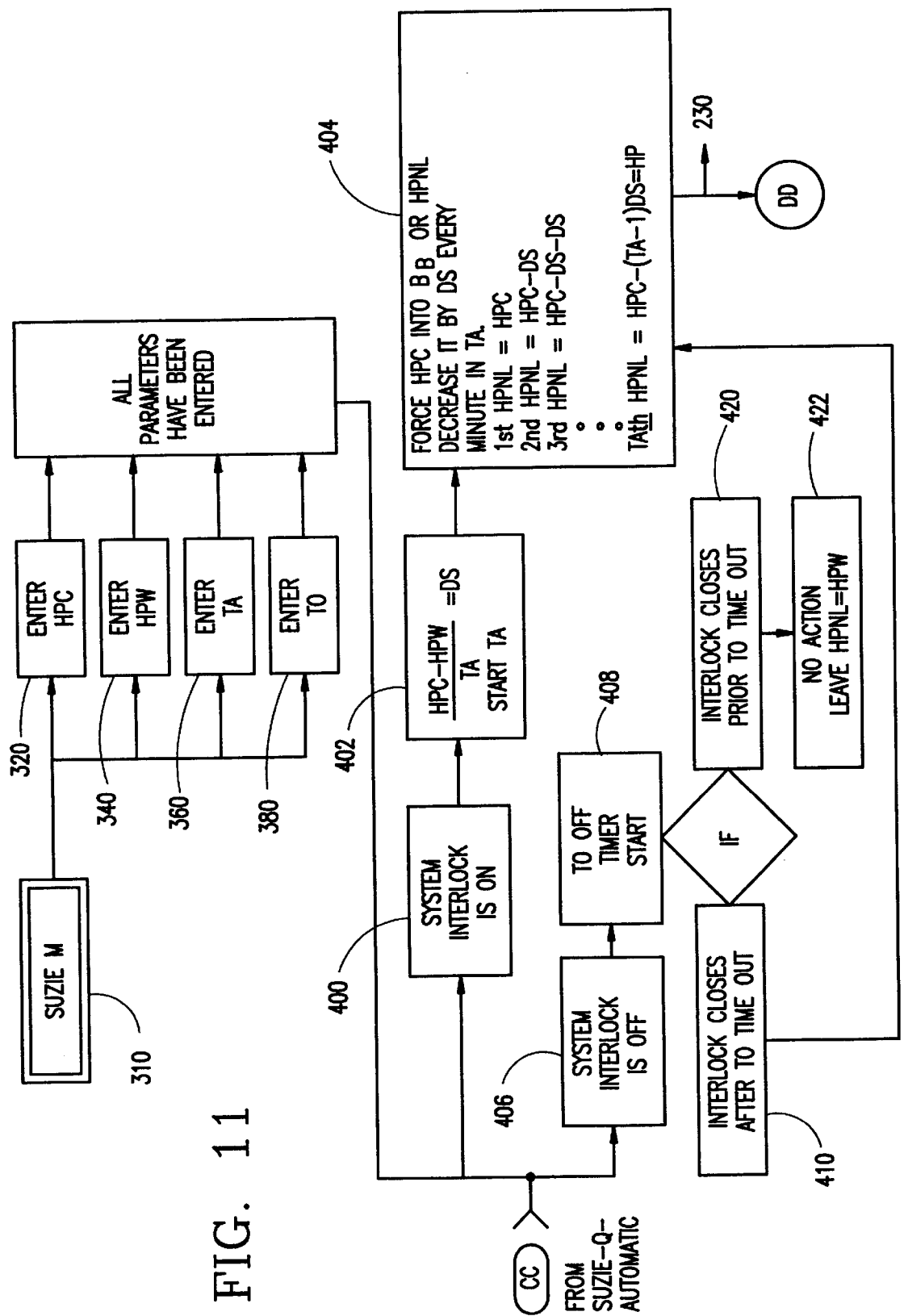

SUZIE-M will now be described with reference to FIG. 11. SUZIE-M is activated at step 310. HPC is entered at step 320. HPW is entered at step 340. A reasonable TA is entered at step 360. TA is in minutes or time in which the user forces the start-off HPC down to HPW. TO is entered at step 406.

Once the parameters HPC, HPW, TA and TO are determined and entered into the MSP, they would not be entered again, unless the user wants to use a different set of data, for example, to account for changes in the seasons. When the system is started, either the HPNL will start at HPC and be decreased progressively to HPW, or HPNL will start with HPW, depending on whether TO has timed out or not.

The electric motor 2 is started, causing the system interlock to turn on at step 400. The TA timer is started when the interlock is turned on. The algorithm calculates an amount DS at step 402 by which HPNL starting as HPC will be forced to HPW for each minute of TA. DS is determined by dividing the difference between HPC and HPW by the number of minutes in TA. HPNL is progressively decreased by the amount DS for each minute of TA at step 404, such that at the end of TA, HPNL is equal to HPW. The final value at the end of TA must be forced to HPW and not a fraction of HPW due to division remainders.

When the conveyor system is turned off, interlock goes off at step 406 and the TO timer is started at step 408. If the system interlock is off by time greater than TO at step 410, then the algorithm would start with HPC the next time the conveyor system is turned on. If the interlock closes prior to TO timing out at step 420, the algorithm will not force HPC into HPNL but will keep HPW in HPNL at step 422.

Once the parameters have been entered and the displacement system interlock is on, the B point of the linear equation relating horsepower to material output will advantageously self-compensate uninterrupted, regardless of whether there is or is not material in the displacement system. AUTO-TARE is not available when SUZIE-M is active.

SUZIE-Q-AUTOMATIC will now be described with reference to FIGS. 12A and 12B. SUZIE-Q-AUTOMATIC advantageously self-compensates for seasonal changes and/or temperature variations through the week. Two queues are established—a three level queue for HPC, containing three values of HPC (HPC1, HPC2 and HPC3) and a three level queue for HPW, containing three values of HPW (HPW1, HPW2 and HPW3). When the queues are updated, the oldest value HPC3 or HPW3, depending on which queue is being updated, is thrown out to make room for the new value. The values in the queues are used to calculate the average for HPC and HPW, denoted HPCX and HPWX, respectively. The algorithm works in conjunction with SUZIE-M, using HPCX in place of HPC and HPWX in place HPW. Both HPCX and HPWX will slowly drift to the season or temperature by using the average of the three samples, creating a self-adjusting mechanism without user involvement.

Figure 12A:
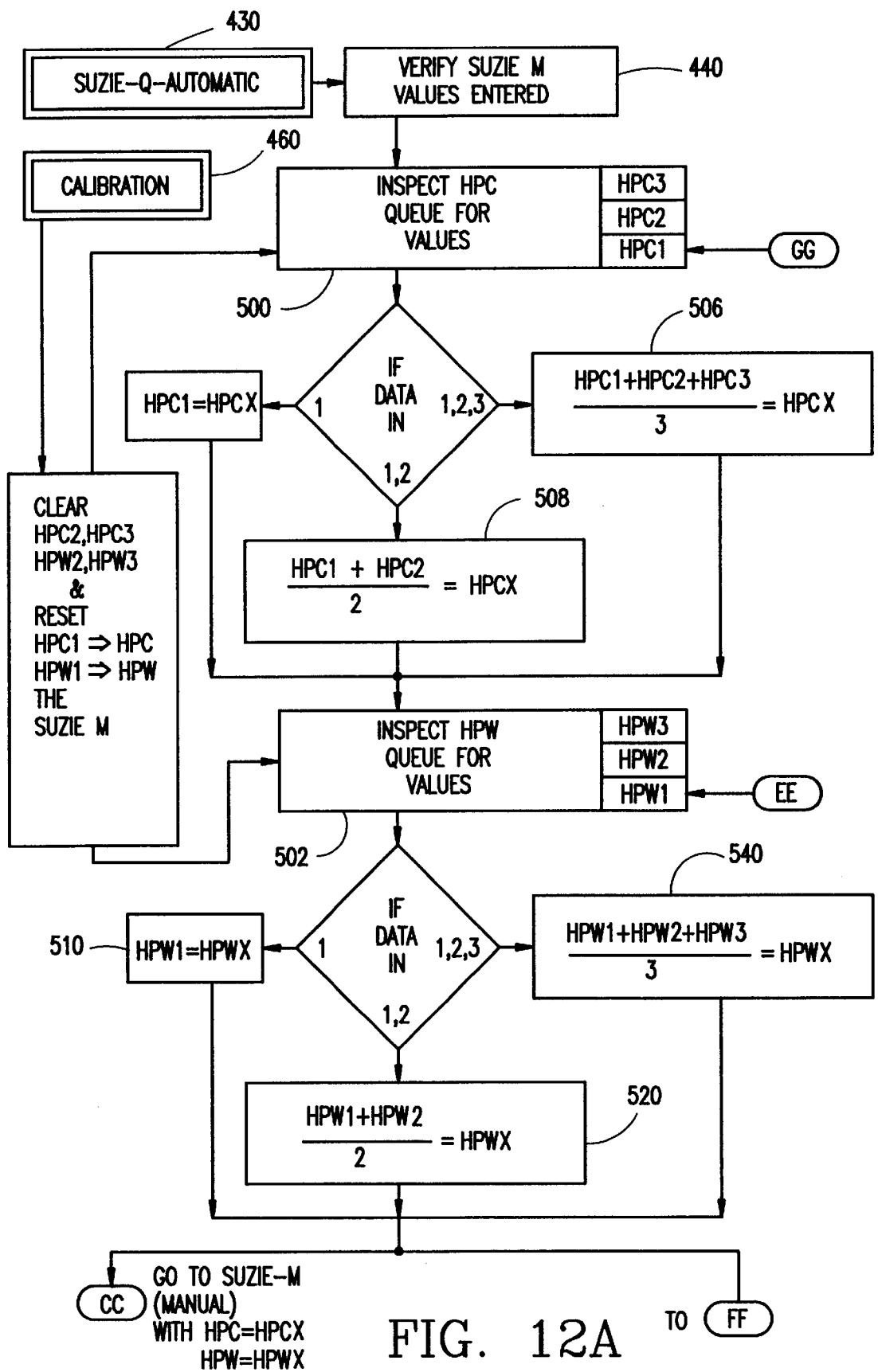
Figure 12B:
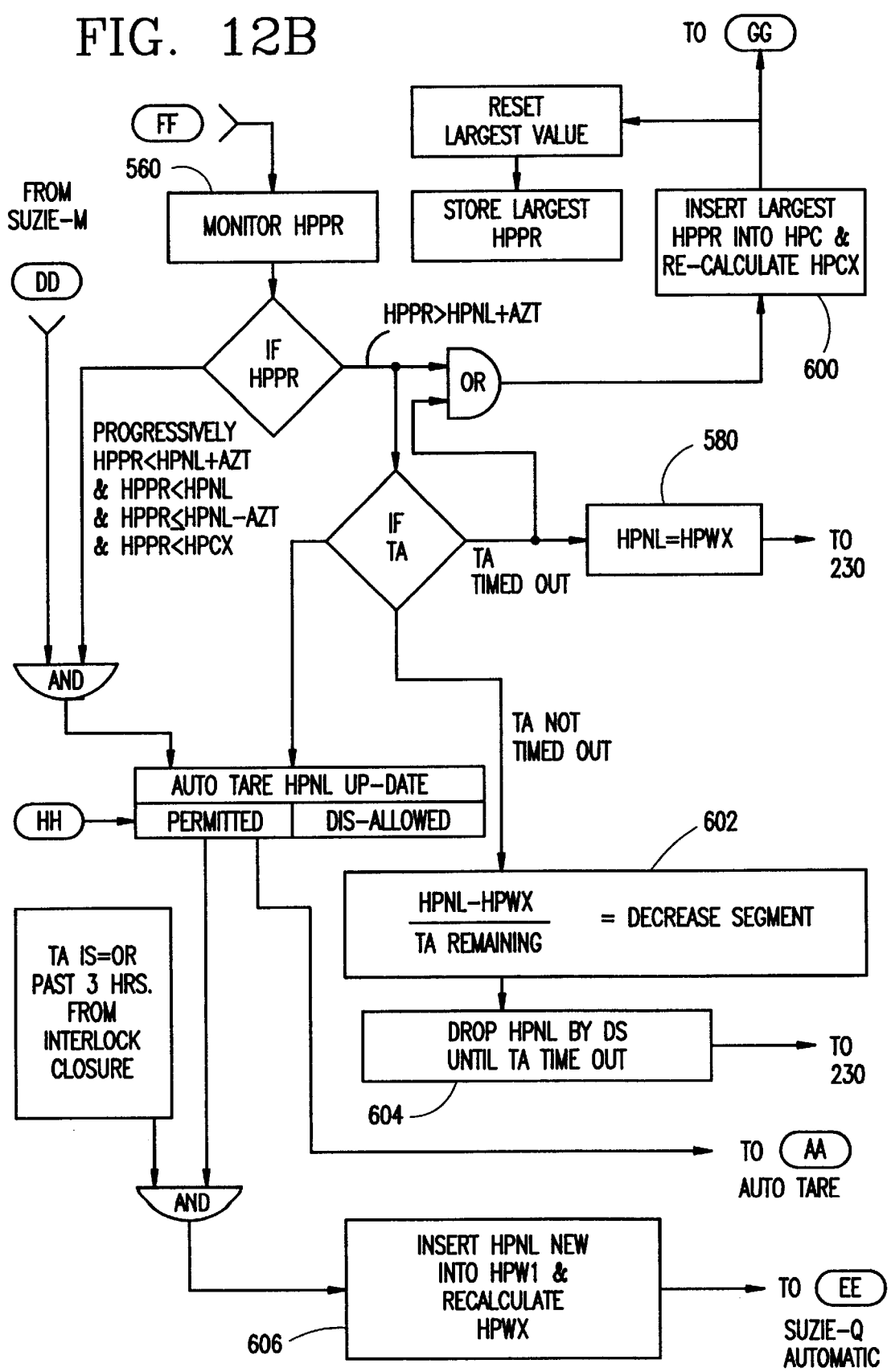

Referring to FIG. 12A, SUZIE-Q-AUTOMATIC is selected at step 430 and the SUZIE-M parameters are verified that they are entered at step 440. Initial calibration of the system, when the operating curve is first established by taking belt cuts, as described above, generally indicated at step 460, clears HPC2, HPC3, HPW2 and HPW3 from the respective queues. HPC1 is set to HPC and HPW1 to HPW in the SUZIE-M algorithm at step 480. The values of the HPC queue and the HPW queue are inspected at steps 500 and 502, and depending on the number of data in the respective queues, HPCX and HPWX are calculated at steps 504, 506, 508, 510, 520 and 540. The values HPCX and HPW are sent to SUZIE-M algorithm with HPC equal HPCX and HPW equal HPWX.

The conveyor system is energized, system interlock is on and the conveyor belt is running empty. TA starts timing. HPCX is forced into HPNL. After a time delay, such as 8 seconds, after the interlock is made to bypass start-up surges, SUZIE-M is enabled using HPCX as the initial HPNL or B point, slowly decreasing it within time TA to HPWX.

Concurrently, the MSP monitors HPPR at step 560 for the largest value which it inserts into the HPC queue at step 600 and re-calculates the new HPCX when the conveyor system is loaded (HPPR goes beyond the upper limit of the AZT window, i.e, HPNL+AZT) or TA times out. AUTO-TARE is disabled when HPPR goes beyond the upper limit (HPNL+AZT) and remains disabled until HPPR has progressively decreased either equal or has reached below the lower limit (HPNL−AZT). Progressively decreasing means HPPR is steadily dropping, indicating the system Angst been loaded prior to starting and is now unloading.

As soon as the MSP determines material has been introduced into the system, meaning that the HPPR values have steadily increased in the positive direction has in fact progressed beyond the upper limit (HPNL+AZT), AUTO-TARE is disabled, which updates HPCX at step 600. The MSP will look at the remaining time in TA, along with the present HPNL and drop the present HPNL to HPWX in the remaining time left in TA, at steps 602 and 604. Again the final value at the end of the time period set by TA must be forced to HPWX and not a fraction thereof. The B point of the curve is updated at step 230. If TA has timed out by this point, the MSP immediately forces HPWX into HPNL, at step 580 to update the curve B point at step 230.

If the system is purged or empty of material and the system has been running for a period greater than TA, AUTO-TARE is then automatically enabled. The MSP monitors the HPNL produced by AUTO-TARE. If the HPNL value produced is with the interlock made, with TA timed out, is above the motor no-load horsepower, has progressively decreased below the upper limit (HPNL+AZT) and moving toward the lower limit (HPNL−AZT), is less than HPCX, and the conveyor system has been on at least three hours past the interlock closure, the HPNL is inserted into the HPW queue at step 606 at maximum of once every 12 seconds and a new HPWX is re-calculated.

If the displacement system started with load or material inside of it, and the system has been off for more then TO, i.e. the interlock was open for more than the time set in the off timer TO, HPPR will soar way beyond the upper limit (HPNL+AZT), and after about 8 second delay after start-up, disabling AUTO-TARE and the algorithm will force HPCX into HPNL, decreasing it down to HPWX in TA minutes incrementally. If the system was not off for more than TO, the MSP will continue using HPWX in HPNL upon start-up. No further alterations are made to HPNL until the system empties again and AUTO-TARE is enabled.

While this invention has been described as having preferred design, it is understood that it is capable of further modification, uses and/or adaptations of the invention following in general the principle of the invention and including such departures from the present disclosure as come within known or customary practice in the art to which the invention pertains, and as may be applied to the essential features set forth, and fall within the scope of the invention or the limits of the appended claims.

I claim:

1. A flow rate monitor for indicating the amount of material being displaced in a displacement system having a prime mover, comprising:
   a) power demand monitor operably connected to the prime mover and adapted to provide power demand data of the prime mover;
   b) a programmable controller operably connected to said power demand monitor, said controller being adapted to convert data from said power demand monitor to flow rate data using n number of linear equations as follows, $$X=(HP-Y_1)/[(Y_2-Y_1)/(X_2-X_1)], \quad Y_1 \leq HP < Y_2$$

$$X=(HP-Y_2)/[(Y_3-Y_2)/(X_3-X_2)]+X_2, \quad Y_2 \leq HP < Y_3$$

$$X=(HP-Y_n)/[(Y_{n+1}-Y_n)/(X_{n+1}-X_n)]+X_n, \quad Y_n \leq HP \leq Y_{n+1},$$

where, $n \geq 2$,

X is the flow rate of the material being conveyed, in units of weight per unit of time, HP is the monitored power demand of the prime mover, $Y_1$ is the system-no-load power demand with the displacement system running empty, $Y_2, Y_3, \ldots Y_n$ are predetermined power demand values between the system-no-load power demand, $Y_1$, and the maximum power demand of the prime mover, $Y_{n+1}$ is the maximum horsepower demand of the prime mover, $X_1$ is zero, $X_2$ is an actual flow rate measurement taken at $Y_2$, $X_3$ is an actual flow rate measurement taken at $Y_3$, $X_n$ an actual flow rate measurement taken at $Y_n$, $X_{n+1}$ is the maximum flow rate at maximum HP; and c) said programmable controller including an output signal representing the flow rate of the material being conveyed based on said equations, said output signal for being connected to an output device.

2. A flow rate monitor as in claim 1, wherein:
   a) said programmable controller is a programmable logic controller.

3. A flow rate monitor as in claim 1, wherein:
   a) said programmable controller includes an analog output for being connected to a display.

4. A flow rate monitor as in claim 1, wherein:
   a) said programmable controller includes a pulse train output for being connected to a totalizer display.

5. A flow rate monitor as in claim 1, wherein:
   a) said programmable controller includes an analog output for being connected to a display;
   b) said programmable controller includes a pulse train output for being connected to a totalizer display; and
   c) said pulse train output is automatically speeded up or slowed down such that the number of pulses per unit time is equal to the flow rate provided by said analog output over the same unit of time.

6. A flow rate monitor as in claim 1, wherein:
   a) said programmable controller is adapted to generate an output when a preselected high value is exceeded by the power demand of the prime mover, said output for being connected to an alarm device.

7. A flow rate monitor as in claim 1, wherein:
   a) said programmable controller is adapted to generate an output when the power demand of the electric motor falls below a low value, said output for being connected to an alarm device.

8. A flow rate monitor as in claim 1, wherein:
   a) said programmable controller is adapted to be calibrated to an existing displacement system.

9. A flow rate monitor for indicating the amount of material being displaced in a displacement system having an electric motor as a prime mover, comprising:
   a) power demand monitor for being operably connected to the electric motor;
   b) a programmable controller operably connected to said power demand monitor, said controller including a program adapted to convert the data from said power demand monitor to flow rate data;

c) said program including at least one linear equation relating the flow rate of the material to the power demand of the electric motor, said linear equation providing zero flow rate at no-load power demand;

d) said program including a step for parallel shifting said at least linear equation to compensate for changes to the no-load power demand;

e) an indicator operably associated with said controller for indicating the flow rate of the material; and f) said step for parallel shifting including determining when the displacement system is running empty, monitoring the power demand monitor over a preselected period, averaging the data to obtain a new no-load power demand, and replacing the no-load demand in at least one linear equation with the new no-load power demand.

10. A flow rate monitor as in claim 9, wherein:

a) said averaging includes monitoring the value and the number of times the power demand is above or below the current no-load power demand; and b) averaging the power demand values that occurred the most above or below the no-load power demand.

11. A flow rate monitor for indicating the amount of material being displaced in a displacement system having an electric motor as a prime mover, comprising:

a) power demand monitor for being operably connected to the electric motor;

b) a programmable controller operably connected to said power demand monitor, said controller including a program adapted to convert the data from said power demand monitor to flow rate data;

c) said program including at least one linear equation relating the flow rate of the material to the power demand of the electric motor, said linear equation providing zero flow rate at no-load power demand;

d) said program including a step for parallel shifting said at least linear equation to compensate for changes to the no-load power demand;

e) an indicator operably associated with said controller for indicating the flow rate of the material;

f) said step of parallel shifting includes determining the cold power demand when the system is started cold;

g) determining the warm power demand when the system has been running for a preselected time;

h) using cold power demand in the said at least one linear equation; and i) reducing the cold power demand by an amount for each fraction of time of the preselected time until the warm power demand is reached.

12. A flow rate monitor for indicating the amount of material being displaced in a displacement system having an electric motor as a prime mover, comprising:

a) power demand monitor for being operably connected to the electric motor;

b) a programmable controller operably connected to said power demand monitor, said controller including a program adapted to convert the data from said power demand monitor to flow rate data;

c) said program including at least one linear equation relating the flow rate of the material to the power demand of the electric motor, said linear equation providing zero flow rate at no-load power demand;

d) said program including a step for parallel shifting said at least linear equation to compensate for changes to the noload power demand;

e) an indicator operably associated with said controller for indicating the flow rate of the material; and f) said at least one linear equation is shifted by an amount equal to the average of horsepower readings during a sampling period that predominates above or below the no-load power demand.

* * * * *